United States Patent [19]

Matz

[11] 3,984,644

[45] Oct. 5, 1976

[54] CENTRAL DICTATION SYSTEM WITH CODED CONSTANT CURRENT LEVELS FOR TRANSMISSION OF CONTROL SIGNALS

[75] Inventor: Bjorn J. Matz, Forest Hills, N.Y.

[73] Assignee: Dictaphone Corporation, Rye, N.Y.

[22] Filed: Dec. 27, 1974

[21] Appl. No.: 536,753

[52] U.S. Cl. .................. 179/100.1 DR; 179/2 A; 179/6 E
[51] Int. Cl.² .................. G11B 15/00; H04M 11/10
[58] Field of Search ........... 179/100.1 DR, 6 E, 2 A

[56] References Cited
UNITED STATES PATENTS

| | | | |
|---|---|---|---|
| 2,979,568 | 4/1961 | Logan | 179/6 E |
| 3,046,338 | 7/1962 | Higham | 179/6 E |
| 3,835,261 | 9/1974 | Matz | 179/100.1 DR |
| 3,839,600 | 10/1974 | Matz | 179/100.1 DR |

Primary Examiner—Raymond F. Cardillo, Jr.
Attorney, Agent, or Firm—Curtis, Morris & Safford

[57] ABSTRACT

A central dictation system including a plurality of remote dictate stations and a plurality of record/reproduce stations. Any one of the remote dictate stations is capable of communicating with any one of the record/reproduce stations so as to execute a dictation operation. When a record/reproduce station is communicating with a dictate station, the remaining dictate stations are prevented from gaining access to that communicating record/reproduce station. Various operating functions at the record/reproduce station are controlled from the remote dictate station by the transmission of constant currents having predetermined magnitudes representing the particular functions to be performed. The constant currents received at the record/reproduce station are decoded into predetermined control signals whereby functions such as dictate, rewind, stop, playback, fast forward and transfer can be attained. In the performance of a transfer function, a remote dictate station is transferred into communication with a predetermined, additional record/reproduce device which, typically, can be reserved for the recording and transcription of information having a high priority.

27 Claims, 6 Drawing Figures

CENTRAL DICTATION SYSTEM WITH CODED CONSTANT CURRENT LEVELS FOR TRANSMISSION OF CONTROL SIGNALS

BACKGROUND OF THE INVENTION

This invention relates to a central dictation system and, in particular, to the generation and detection of various function commands and to the manner in which such functions are controlled in response to such commands.

Central dictation systems are known wherein a central record/playback unit is adapted to be individually accessed by any one of a plurality of remote dictate stations so as to record dictated information on a record medium. In such systems, the central record/playback unit can be accessed by only a single dictate station at any given time. While one dictate station is in communication with the central unit all other dictate stations are excluded, or locked out, from also communicating with the central unit.

The advantage of such central dictation systems is that individual dictators need not be concerned with the manipulation of various recording media, nor need they attend to the time consuming task of delivering recording media having dictation thereon to appropriate personnel for transcription. In the typical central dictation system, a recording medium having a relatively large capacity for recording dictation is provided so that received dictation communicated from a remote dictation system is recorded on the medium and can be subsequently reproduced for transcription. In one type of central record/playback unit, the record medium consists of an endless loop of magnetic tape which is driven past a dictation transducing station and is also driven past a transcribing transducing station. These stations are essentially operated independently of each other so that a dictation operation can be performed simultaneously with and independently of a transcribing operation. Thus, such a central dictation system advantageously permits the efficient use of dictating and transcribing apparatus. Moreover, dictated information can be almost immediately transcribed. A typical prior art central dictation system having an endless loop of magnetic tape is described in U.S. Pat. No. 3,817,436, issued June 18, 1974, and is assigned to Dictaphone Corporation, the assignee of the present invention.

Central dictation systems of the aforenoted type can be readily adapted to accomodate a high volume of dictation by providing plural record/playback units at a central location and by providing suitable switching apparatus which permits any one remote dictate station to gain access to any one of the plural record/playback units. However, it has been found that, as more central units are provided to thereby accommodate more remote dictate stations, the distance between many such remote stations and the central units becomes quite large. Consequently, it is necessary to provide conducting cables having extremely long length between such remote stations and the central units to permit information to be transmitted therebetween. The inherent resistance of very long conducting cables tends to deleteriously affect the levels of control commands which must be transmitted from the remote station to the central unit to control a dictation operation. Typically, such control commands have been represented by DC voltages of predetermined magnitudes or several magnitudes of resistances connected to the transmission path, each magnitude representing a control function, or command to be performed at the central unit. Unfortunately, the impedance loading effect attributed to the conducting cables distorts the control command magnitudes so that an erroneous command can be received at the central unit thus causing an improper function to be performed.

Although it is technically feasible to account for such loading effects prior to the installation of the central dictation system, it usually is impractical to adjust each remote dictate station function generator in accordance with the length of conducting cable extending betwteen that station and the central unit. In addition, for those applications wherein a remote dictate station can gain access to any one of plural record/playback units, and wherein such record/playback units are disposed at various locations, the resultant variations in cable length from the remote station to each central unit cannot be readily accounted for. Also, where the remote stations are connected through a switching apparatus, such as a conventional telephone PBX apparatus, various random cable lengths can be provided between the remote station and the record/playback unit ultimately connected thereto.

Therefore, it is one feature of the present invention to provide a control function generator in each remote dictate station that transmits function commands to the central units which are substantially unaffected by the cable length extending therebetween.

In central dictation systems of the aforenoted type, it often is necessary for a dictator to be furnished with the immediate transcription of dictated information. However, since a large amount of dictated information previously recorded on the endless magnetic tape might be awaiting transcription, a delay can be expected until such dictated information is transcribed. Although some central dictation systems permit a transcribing station to be switched from connection with the transcription head to the dictation head so as to effectively by-pass the stored tape awaiting transcription, and to thus immediately transcribe the dictated information last recorded on the tape, it has been found that this mode of operation is accompanied by various disadvantages. For example, if the dictation transducer of the record/playback unit is being used to perform a transcription operation, then that unit cannot be utilized to record dictation until such transcription operation is completed. Also, whereas the record/playback unit, when used in its normal modes of operation, advantageously permits the simultaneous recording of dictation and transcription of recorded dictation, the use of the dictation transducer for a transcription operation requires that the dictated information first be completed. The simultaneous dictation and transcription operation cannot be performed.

Therefore, it is another feature of the present invention to transfer a remote dictate station to a predetermined, additional record/playback unit so that dictated information having a high priority of importance can be transcribed almost immediately, and wherein simultaneous dictation and transcription operations can be performed.

OBJECTS OF THE INVENTION

It is, therefore, an object of the present invention to provide an improved central dictation system wherein the aforenoted disadvantages of prior art systems are overcome.

It is a further object of the present invention to provide a central dictation system wherein control function commands are transmitted from a remote dictate station to a central record/reproduce station without suffering degrading effects attributed to random cable lengths extending therebetween.

Yet another object of this invention is to provide an improved function signal generator for a central dictation system whereby function command signals are generated and transmitted in the absence of deleterious affects thereon.

Another object of this invention is to provide a function signal decoder for a central dictation system whereby function command signals transmitted to a record/reproduce station are accurately decoded to thereby control the performance of various dictation functions.

It is a further object of the present invention to provide an improved central dictation system wherein any one of a plurality of remote dictate stations can be individually connected to any one of a plurality of record/reproduce stations and wherein an additional predetermined record/reproduce station is provided to be selectively connected to a communicating remote dictate station, thereby expediting the rapid transcription of important dictated information.

Still another object of this invention is to provide apparatus for use in a central dictation system wherein a maximum number of functions can be performed in response to a minimum number of transmitted control signals. An additional object of this invention is to provide an improved central dictation system wherein a remote dictate station transmits function command currents to a record/reproduce station whereat such currents are decoded to produce selective function control signals and wherein such function control signals actuate apparatus for performing selected functions.

Yet a further object of this invention is to provide improved function control apparatus for a central dictation system.

Various other objects and advantages of the present invention will become apparent from the forthcoming detailed description thereof and the novel features will be particularly pointed out in the appended claims.

SUMMARY OF THE INVENTION

In accordance with this invention, a central dictation system is provided including at least one record/reproduce station for recording dictated information on a record medium and for reproducing same, and having at least one remote dictate station adapted to communicate with the record/reproduce station, and wherein the functions of the record/reproduce station are controlled by a constant current generator provided at the remote dictate station, the constant current generator being actuated when the remote dictate station is operatively connected to a record/reproduce station to thereby transmit constant currents of predetermined magnitudes which are determinative of functions to be performed; the magnitudes of the transmitted currents being sensed at the record/reproduce station by a current detector for decoding such currents into control signals and the control signals being selectively applied to a function controller whereby the selective performance of predetermined functions at the record/reproduce station is controlled. In one embodiment of the present invention, one of the controllable functions is a transfer function whereby a remote dictate station is switched from a record/reproduce station to an additional, predetermined record/playback unit to enable dictated information to be recorded at the additional, predetermined unit.

BRIEF DESCRIPTION OF THE DRAWINGS

The following detailed description will best be understood in conjunction with the accompanying drawings in which.

DETAILED DESCRIPTION OF A CERTAIN ONE OF THE PREFERRED EMBODIMENTS OF THE PRESENT INVENTION

The Central Dictation System

Figure 1:
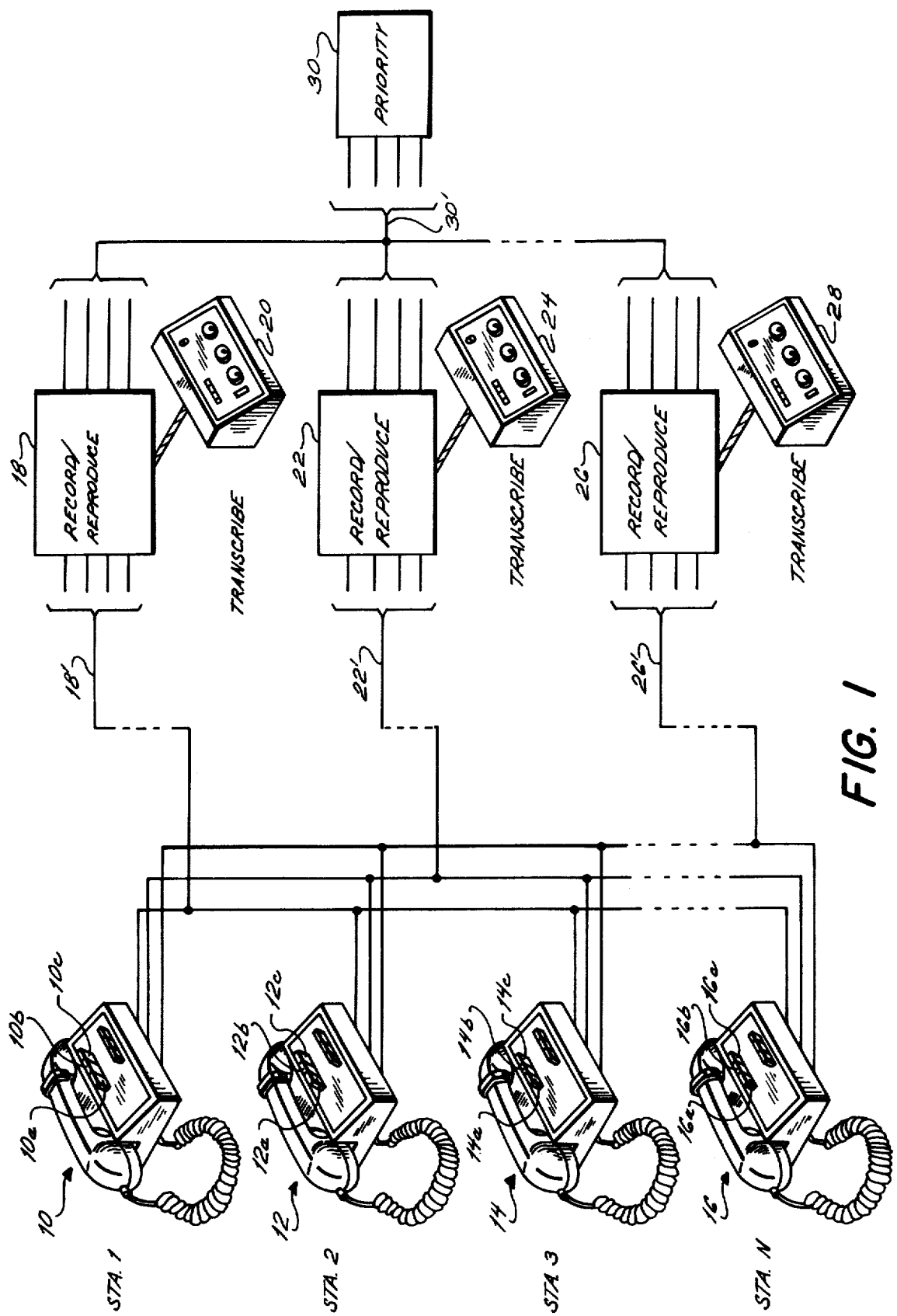
FIG. 1 is a block diagram representing a central dictation system of the type wherein the present invention finds ready application.

Referring now to the drawings and, in particular, to FIG. 1, there is illustrated a block diagram representing a central dictation system comprised of a plurality of remote dictate stations, a plurality of record/reproduce stations and a plurality of transcribe stations. As depicted, N remote dictate stations can be provided and, in the interest of simplification, only four dictate stations 10, 12, 14 and 16 have been shown. Similarly, although any convenient number of rercord/reproduce stations can be provided, only three such stations 18, 22 and 26 have been shown. Typically, the record/reproduce stations may be provided at a central location and the remote dictate stations may be provided at any convenient locations and may be separated from the central location by any suitable distance. For example, the remote dictate stations may be situtated in various separate offices in an office building and the central location may be situated at a designated centralized location in such office building.

A typical record/reproduce station 18 is comprised of a record medium such as an endless loop of tape, in combination with various transducing heads, tape drive mechanisms, audio electronics and control apparatus for effecting the recording and reproduction of audio information for achieving a dictation and a transcription operation. The record medium included in the record/reproduce station is adapted to be driven so as to traverse a dictation site having a magnetic transducer such as a combination record/playback/erase head, and a transcription site, also having a magnetic transducer such as a playback head. Although physically contained within the same structure, the dictation and transcription sites are independently operated. In addition, since dictation can proceed without a concurrent transcription operation, tape which has been dictated and which is awaiting transcription is adapted to be stored in serpentine fashion within a tape housing storage location between the dictation and transcription sites. Also, since transcription can proceed without a concurrent dictation operation, magnetic tape which has been transcribed and is awaiting subsequent reuse at the dictation site is adapted to be stored, also in serpentine fashion, at another location between the dictation and transcription sites. Accordingly, the record/reproduce station can be similar to the record/playback unit described in the aforenoted U.S. patent.

Since each remote dictate station is capable of communicating with any of the record/reproduce stations 18, 22 and 26, each record/reproduce station is connected to each of the remote dictate stations by a conducting cable. Accordingly, the record/reproduce station 18 is connected by a conducting cable 18' to the N remote dictate stations. As shown, these remote dictate stations are connected in parallel to the conducting cable 18'. Similarly, the record/reproduce station 22 is connected via a conducting cable 22' to each of the N remote dictate stations. So also, a conducting cable 26' connects the record/reproduce station 26 to each of the N remote dictate stations. Although all of the illustrated remote dictate stations are connected in parallel to each of the record/reproduce stations, it will be shown hereinbelow that only a single dictate station can communicate at any given time with a single record/reproduce station. Hence, in an expected installation comprised of many more remote dictate stations than there are record/reproduce stations, it will be appreciated that, when each of the record/reproduce stations is communicating with a remote dictate station, any additional remote dictate station will be precluded from gaining access to a record/reproduce station. Suitable seizure and privacy control circuits are provided for this purpose and will be described in greater detail hereinbelow.

A typical remote dictate station, such as the dictate station 10, is comprised of audio and function control apparatus which is connected by a conducting cable through a plurality of switches 10a, 10b, and 10c to the conducting cables 18', 22' and 26'. The purpose of the switches 10a–10c is to permit an operator at the dictate station 10 to select a particular record/reproduce station to which audio information and function control commands are to be transmitted. The switches 10a–10c may, therefore, comprise conventional push button-type switches having visual indicators, such as lamps, associated or integral therewith. The purpose of such lamps is to indicate when a particular record/reproduce station is unavailable to be accessed by a remote dictate station, such as when that record/reproduce station is then communicating with another dictate station, and to thus enable an operator to properly select an available record/reproduce station for communication. Thus, if the record/reproduce station 18 is available, an operator at the remote dictate station 10, by depressing the switch 10a will connect the audio and control function electronics 11 at the dictate station 10 to the record/reproduce station 18 via the conducting cable 18'. Similarly, if the record/reproduce station 22 is available, the switch 10b, upon being closed will connect the audio and control function electronics 11 to the record/reproduce station 22 via the conducting cable 22'. The operation of the switch 10c effects a similar connection between the remote dictate station 10 and the record/reproduce station 26. If a switch associated with an unavailable record/reproduce station is depressed, the remote dictate station will not be operably connected thereto and, in one embodiment, a distinctive signal, such as a predetermined tone, will be provided at the remote dictate station to signify the unavailability of the selected record/reproduce station. The privacy and siezure control circuitry which insures that only a single remote dictate station can gain access to a record/reproduce station may be of the type described in U.S. Pat. No. 3,835,261, which issued on Sept. 10, 1974 and is assigned to the assignee of the present invention. A signal which is extended to all remote dictate stations from a record/reproduce station to indicate the status, i.e., availability, of such record/reproduce station is transmitted over one of the conducting channels included in the conducting cable, such as cable 18'.

The various function commands generated from each of the remote dictate stations are transmitted to a record/reproduce station over another conducting channel included in the conducting cable, such as cable 18'. These command signals are constant currents of predetermined magnitudes and are generated in response to the selective manual operation of various switches disposed at the dictate station. Typical of such function commands are "dictate", "rewind", "stop", "play", and "fast forward". Each of these command signals serves to control the movement of tape past the dictation transducer site and, additionally, conditions the dictation transducer for a record or playback mode of operation. An example of mechanical driving apparatus which is used to move the magnetic tape is disclosed in co-pending application Ser. No. 536,856, filed on even date herewith.

Audio signals are transmitted from a remote dictate station to a record/reproduce station during dictation and are returned to the remote dictate station during a review of recorded information via a further conducting channel included in the conducting cable, such as conducting cable 18'. A further conducting channel included in the conducting cable is adapted to extend the system reference potential, such as ground, to a remote dictate station when the record/reproduce station is properly accessed by the remote dictate station.

In a typical remote dictate station, the sound transducers for converting sound signals into audio signals and for transducing audio signals into sound signals are provided as a conventional microphone and loudspeaker. Such sound transducers are contained in a handset which is associated with various function control switches. Typically, the handset is adapted to be supported on a cradle having a cradle switch which is actuated when the handset is removed to thereby gain access to a record/reproduce station and is deactuated when the handset is returned to the cradle upon the completion of a dictation operation. To insure that subsequent dictated information which might be derived from another remote dictate station is not recorded over previously recorded information, the deactuation of a cradle switch results in the automatic recording of a predetermined code immediately following a recorded message. This predetermined code is sensed when the tape is reversed past the dictation transducer site to automatically prevent further tape bearing prerecorded information from also being reversed past the dictation transducer. Thus, a subsequent dictation operation will not affect previously recorded information; nor will such previously recorded information be reproduced during a subsequent dictation or playback operation. The recording of such predetermined code and the sensing thereof is described in detail in copending application Ser. No. 536,754, filed on even date herewith.

Although each of the remote dictate stations is here illustrated as including plural station selecting switches, such as switches 10a, 10b and 10c, to thereby permit an operator to manually select a desired record/reproduce station for communication, in an alternative embodiment such manual selecting switches are replaced by an automatic switching matrix. Such switching matrix is conventional and is of the type generally used in telephone switching applications. When such an automatic switching matrix is used, a remote dictate station is automatically connected to the first record/reproduce station which becomes available. The conditioning of a record/reproduce station with respect to its availability can be a function of the amount of unused tape present therein and upon which information can be recorded.

As a further feature of the central dictation system illustrated in FIG. 1, an additional, predetermined record/playback unit 30 is provided and is intended to receive dictate information for recording when such information is of a high priority of importance. As shown, the priority unit 30, which may be similar to the record/reproduce stations 18, 22 and 26, is connected by a conducting cable 30' to each of the record/reproduce stations 18, 22 and 26. The cable 30' may include multiple conducting channels such as are included in each of the cables 18', 22' and 26'. The record/reproduce stations 18, 22 and 26 are connected in parallel to the conducting cable 30' by additional cables, each including multiple conducting channels. Accordingly, the priority unit 30 bears the same relationship to each of the record/reproduce stations as does a record/reproduce station to each of the remote dictate stations. As will be described in greater detail hereinbelow, when a "transfer" function command is transmitted from a remote dictate station to a record/reproduce station in communication therewith, such transfer command results in the switching of, for example, the dictate station 10 from communicating with, for example, the record/reproduce station 18, to now communicate with the priority unit 30. A conducting path will thus extend from the cable 18', through the record/reproduce station 18 to the cable 30' and to the priority unit 30. While the remote dictate station is in communication with the priority unit, the record/reproduce station 18 will not be operatively coupled to the remote dictate station, but will maintain a quiescent or stand-by condition until communication with the priority unit is completed.

Each of the record/reproduce stations 18, 22 and 26 is connected to a transcribe station 20, 24 and 28, respectively. By suitable operation thereof, an operator of a transcribe station causes various transcribe control function signals to be transmitted to the associated record/reproduce station to thereby control the movement of the recording tape past the transcription transducer site so as to facilitate a transcribing operation. Generally, the transcribe station is provided with suitable switches, such as foot-pedal actuated switches, to control the movement of the tape past the transcription transducer site. In addition, a sound reproducer, such as a loudspeaker or headphones, is provided to receive reproduced audio signals, and suitable audio electronics are provided to permit an adjustment in the reproduced sound, as desired.

Although not shown herein, an alternative embodiment includes a supervisory console to supervise the operations of the record/reproduce stations, the transcribe stations and the priority unit. For example, suitable switching apparatus can be provided such that each transcribe station is connected through the supervisory console to its associated record/reproduce station. In this configuration, a supervisor can, if desired, connect transcriber 20, for example, to the record/reproduce station 22. Such a connection might be preferred so as to not require an operator at, for example, the transcribe station 20 to relocate at, for example, the transcribe station 24 in order to transcribe the dictated information recorded at the record/reproduce station 22. Also, the skills of a particular transcriptionist may be readily matched to the amount of dictated tape awaiting transcription in a particular record/reproduce station. Also, a supervisory operator may intentionally dispose an otherwise available record/reproduce station into its "unavailable" condition if it is determined that the the capacity of that record/reproduce station to receive additional dictation will soon be reached while another record/reproduce station exhibits far more acceptable capacity. The supervisory console might also be provided with audio communication equipment to permit a supervisory operator to communicate with an operator at a remote dictate station, if desired and might furthermore manually transver such a remote dictate station from communication with a record/reproduce station to communication with the priority unit.

The foregoing general description of a central dictation system of the type depicted in FIG. 1 is merely intended as a broad discussion of various functions, operations and features of such system and is not to be construed as limiting the central dictation system only to those features which have been described.

Dictate Station - Record/Reproduce Station
Communication

Figure 2:
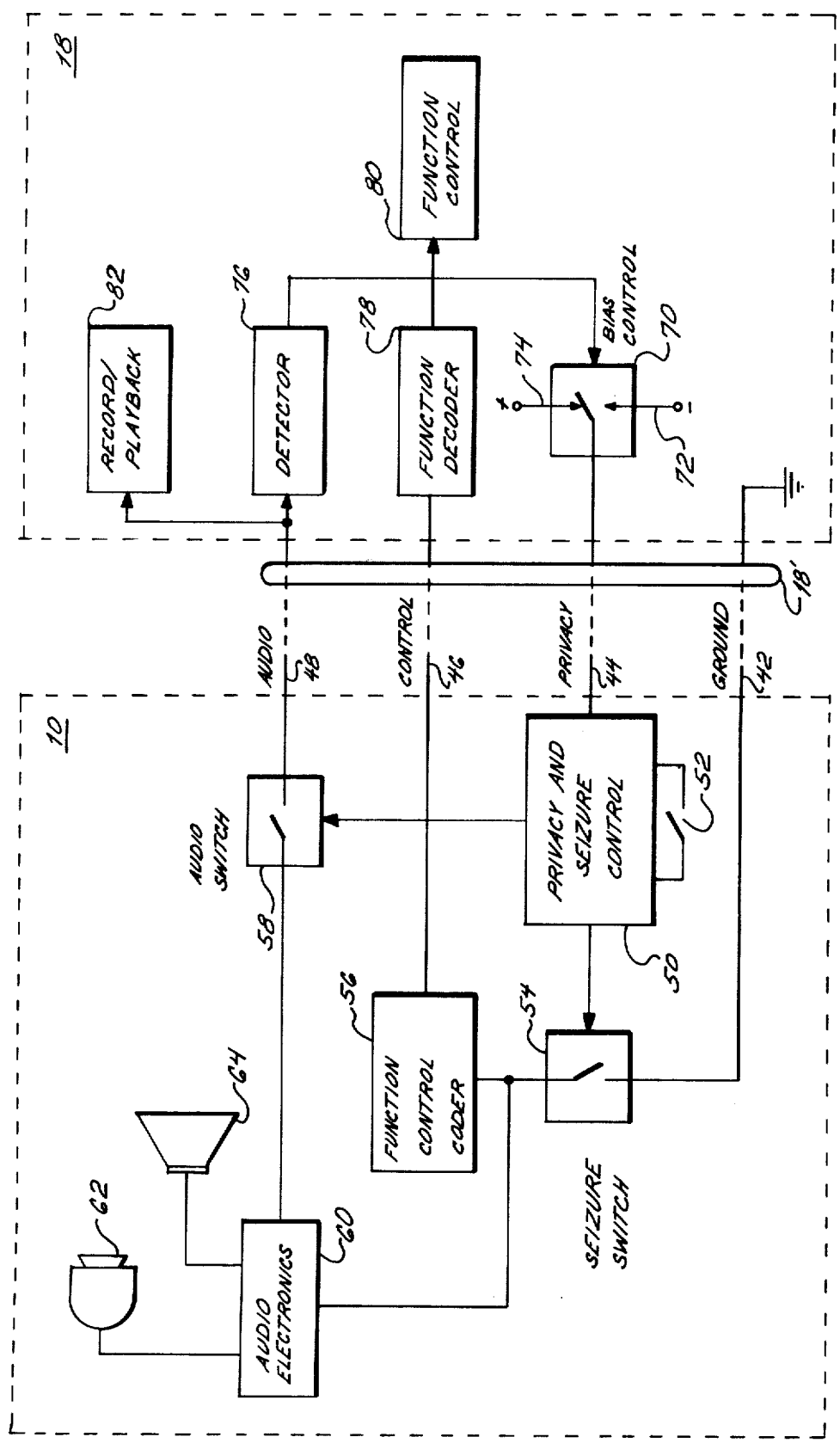
FIG. 2 is a block diagram representing the connections between a remote dictate station and a record/reproduce station in the central dictation system illustrated in FIG. 1.

A block diagram illustrating the connections between a remote dictate station, such as station 10, and a record/reproduce station, such as station 18, is illustrated in FIG. 2. The dictate station 10 is comprised of a privacy and seizure control circuit 50, a seizure switching circuit 54, a function control coding circuit 56, an audio switching circuit 58 and audio electronics 60. In addition, a microphone 62 and a loudspeaker 64 are shown as being connected to the audio electronics such that audio signals can be transmitted to and received from the record/reproduce station. The various functional components of the dictate station 10 are connected to conducting channels included in the conducting cable 18'. It is recalled that this conducting cable extends from the record/reproduce station 18 to each of the remote dictate stations. For convenience, the individual conducting channels included in the cable 18' are designated as a ground line 42, a privacy line 44, a control line 46 and an audio line 48. The privacy line 44 is connected to the privacy and seizure control circuit 50 and is adapted to supply discrete DC voltages representing the availability of the record/reproduce station 18 to communicate with the remote dictate station 10. Such discrete DC voltages are used by the privacy and seizure control circuit 50 to energize the dictate station 10 to thereby permit a dictation operation to be executed.

The ground line 42 is connected through the seizure switching circuit 54 to the function control coding circuit 56 and to the audio electronics 60. The ground line 42 is provided with a reference potential for the central dictation system, such as a system ground. When closed, the seizure switching circuit 54 extends this system ground to the function control coding circuit and to the audio electronics such that these respective components are operably energized. As shown, the seizure switching circuit 54 is connected to the privacy and seizure control circuit 50 and is adapted to be closed thereby when a predetermined DC voltage is supplied to the privacy and seizure control circuits by the privacy line 44.

The function control coding circuit 56 is connected to the control line 46 and, when energized, is adapted to permit constant currents of predetermined DC magnitudes to flow thereover. The particular magnitudes of the constant currents are determinative of control functions which are to be performed by the record/reproduce station 18 in response to the manual selection thereof, as will described in greater detail hereinbelow. Suffice it to say that, because constant currents are transmitted as control function commands, and since a constant current magnitude is not affected by line impedance, substantially identical constant current magnitudes are received at the record/reproduce station for identical function control commands, regardless of the length of the control line 46. That is, the inherent impedance of a long control line will not distort or degrade the magnitude of the constant current transmitted thereover.

The audio switching circuit 58 is effectively closed by the privacy and seizure control circuit 50 when a predetermined DC voltage is supplied to the privacy and seizure control circuit by the privacy line 44. The closing of the audio switch is adapted to establish an audio transmission channel between the audio electronics 60 and the audio line 48 to thereby permit audio information to be transmitted to the record/reproduce station 18 for recording on the record medium and for permitting reproduced audio signals recovered from recorded information to be transmitted from the remote dictate station to the audio electronics 60. The audio electronics are comprised of amplifiers and filters for suitably operating upon audio signals to enable the proper transmission and reception thereof.

The privacy and seizure control circuit 50 is of the type described in aforenoted U.S. Pat. No. 3,835,261. This circuit includes a switch 52 which may be, for example, the cradle switch described hereinabove with respect to FIG. 1. This switch is normally open when the dictate station is not in use and, conversely, is closed when a dictation operation is desired. It will be appreciated that, in accordance with the circuitry included in the privacy and seizure control circuit, when the switch 52 is closed, current flows through the privacy and seizure control circuit only if the predetermined DC voltage is provided on the privacy line 44. This predetermined DC voltage is provided only if the record/reproduce station 18 is in an available condition so as to be capable of communicating with the remote dictate station 10. As described in the aforenoted patent, once current flows through the privacy and seizure control circuit, current flow therethrough will continue even when a second predetermined DC voltage is provided on the privacy line. However, if such second predetermined DC voltage is provided on the privacy line 44 when the switch 52 is first closed, this voltage will not permit current to flow through the privacy and seizure control circuit. Hence, this second DC voltage is an indication that the record/reproduce station 18 is not available for communication with the remote dictate station 10.

The record/reproduce station 18 includes a bias control circuit 70 connected to the privacy line 44, a voltage detecting circuit 76 connected to the audio line 48, a function decoding circuit 78 connected to the control line 46 and function control apparatus 80 and record/playback apparatus 82. The purpose of the bias control circuit 70 and the voltage detecting circuit 76 is to provide indications of the availability of the record/reproduce station 18 to communicate with a remote dictate station and to sense when a remote dictate station has gained access thereto. The bias control circuit 70 can be considered to be a switch, such as a change-over switch, having a first DC voltage supplied thereto by, for example, a first DC voltage source 72, and a second DC voltage supplied thereto via, for example, a second DC voltage source 74. Depending upon the actuation thereof, as will be described below, the bias control circuit 70 is adapted to selectively apply the first DC voltage or the second DC voltage to the privacy line 44. When the record/reproduce station 18 is in a quiescent state, that is, it is not communicating with a remote dictate station, and is available for such communication, the bias control circuit 70 supplies the first DC voltage from the voltage source 72 to the privacy line 44. Such first DC voltage may exhibit a predetermined magnitude and/or polarity. However, if the record/reproduce station 18 is in communication with a remote dictate station, the bias control circuit is changed over to now apply the second DC voltage supplied from the second voltage source 74 to the privacy line 44. This second DC voltage may exhibit a second predetermined magnitude and/or polarity.

The voltage detecting circuit 76 is coupled to the bias control circuit 70 and is adapted to actuate the bias control circuit so as to change over the DC voltage applied to the privacy line 44. The voltage detecting circuit 76 reponds to a first voltage applied thereto by the audio line 48 to maintain the bias control circuit 70 in the condition whereby the first DC voltage applied by the voltage source 72 is applied to the privacy line. The voltage detecting circuit 76 is responsive to a second voltage applied by the audio line 48 to change over the bias control circuit 70 so that the second DC voltage supplied by the voltage source 74 is applied to the privacy line. The first voltage applied to the voltage detecting circuit 76 is produced when none of the remote dictate stations has accessed the record/reproduce station 18; and the second voltage is applied to the voltage detecting circuit when a remote dictate station has gained access to the record/reproduce station.

The function decoding circuit 78 is responsive to constant currents of predetermined magnitudes representing control function commands which are transmitted to the record/reproduce station by a remote dictate station. These received currents are decoded into predetermined control signals which, in turn, are supplied to the function control apparatus 80 to thereby selectively control the various operations at the dictation transducer site in the record/reproduce station 18. The function decoding circuit 78 and the function control apparatus 80 will be described in greater detail hereinbelow.

The record/playback circuitry 82 is responsive to received audio information to thereby supply audio signals to the dictation transducer for recording on the record medium. In addition, during a playback mode, the record/playback circuitry receives audio signals recovered from the record medium by the dictation transducer and transmits such recovered audio information to a communicating remote dictate station.

The manner in which the illustrated components cooperate to permit the record/reproduce station 18 to be accessed and seized for communication by a remote dictate station, such as the station 10, now will be briefly described. Let it initially be assumed that the record/reproduce station is not then communicating with any remote dictate stations and is available to be accessed. Consequently, the bias control circuit 70 is disposed such that the first DC voltage supplied by the voltage source 72 is applied to the privacy line 44 and is thus extended to all of the remote dictate stations connected to the conducting cable 18'. It is recalled that this first DC voltage is sufficient to cause current to flow through a privacy and seizure control circuit 50 at any remote dictate station which will be energized for communication. Also, since the record/reproduce station is not communicating with any remote dictate station, the audio line 48 is provided with a first voltage which is sensed by the voltage detecting circuit 76.

Now, if an operator of the remote dictate station 10 wishes to communicate with the record/reproduce station 18 to execute a dictation operation, the switch 52 is closed. Consequently, current flows through the privacy and seizure control circuit 50 in response to the first DC voltage applied thereby by the privacy line 44, resulting in the closure of the seizure switching circuit 54 and the audio switching circuit 58. When the seizure switching circuit is closed, the ground potential supplied by the ground line 42 is extended to the function control coding circuit 56 and the audio electronics 60. These components are thus energized and now are adapted for operation.

When the audio switching circuit 58 is closed, current now is permitted to flow therethrough, resulting in a voltage change on the audio line 48. This change in the voltage is representative of the fact that the remote dictate station 10 has gained access to the record/reproduce station 18. Accordingly, the voltage detecting circuit 76 responds to their changed voltage to change over the bias control circuit 70 so that the second DC voltage supplied by the voltage source 74 is now applied to the privacy line 44 and, in turn, is extended to all of the remote dictate stations coupled to the conducting cable 18'. This second DC voltage will prevent any other remote dictate station from gaining access to the record/reproduce station, but will not cause the privacy and seizure control circuit 50 at the remote dictate station 10 to be deactuated. Accordingly, the remote dictate station 10 now has gained access to the record/reproduce station 18 and has seized the record/reproduce station in a manner such that the privacy of communication therewith is assured.

When the operator of the dictate station 10 has completed a dictation operation and no longer desires to communicate with the record/reproduce station 18, the switch 52 is opened. It is recognized that, by opening this switch, current no longer flows through the privacy and seizure control circuit 50 with the result that the seizure switching circuit 54 and the audio switching circuit 58 are, respectively, deenergized. When the seizure switching circuit 54 is thus opened, ground potential is removed from the function control coding circuit 56 and the audio electronics 60 which deactivates these components. Also, when the audio switching circuit 58 is opened, the voltage at the audio line 48 now returns to its initial value which is sensed by the voltage detecting circuit 76. This sensed voltage now causes the voltage detecting circuit to change over the bias control circuit 70 to its initial condition whereby the first DC voltage supplied by the voltage source 72 is again applied to the privacy line 44. Accordingly, the voltage detecting circuit 76 has sensed that the remote dictate station 10 is no longer in communication with the record/reproduce station 18 and the bias control circuit 70 now applies a voltage to the privacy line 44 indicative of the availability of the record/reproduce station 18 to communicate with other remote dictate stations.

It is recognized that, when the remote dictate station 10 is in communication with the record/reproduce station 18, the second DC voltage applied to the privacy line 44 from the voltage source 74 by the bias control circuit 70 is of such magnitude and/or polarity that, if the switch 52 in another remote dictate station is closed, this second DC voltage supplied to the privacy and seizure control circuit 50 in such other remote dictate station prevents a current flow through such circuit. Hence, the seizure switching circuit 54 and the audio switching circuit 58 at such other remote dictate station cannot be actuated and communication with the record/reproduce station 18 is inhibited. Thus, when one remote dictate station is communicating with the record/reproduce station, all other remote dictate stations are locked out, and the privacy of communication is assured.

Function Control Coding Circuit

A principle problem attending prior art central dictation systems is that the length of conducting cable which extends between a remote dictate station and a record/reproduce station is often long enough such that the inherent resistance therein presents a deleterious load to the dictate station. Although this loading effect usually does not significantly degrade the quality of the audio signals transmitted between the communicating stations, it can substantially affect the integrity of control signals which are transmitted as function commands from the remote dictate stations to the record/reproduce station. For example, in central dictation systems wherein control signals are represented as discrete voltages such that a particular function command is associated with a corresponding voltage level, the intrinsic resistance of a long conducting cable causes a voltage drop in the control signal which ultimately is received at the record/reproduce station. Although in many instances such a voltage drop can be predicted and thus accounted for either by producing a higher voltage which is to represent a particular function command or by significantly amplifying the received voltage to increase its voltage level at the record/reproduce station. However, as the actual length of conducting cable extending between a remote dictate station and a record/reproduce station might not be known at the time of manufacture or might be changed after an initial installation, it often is quite difficult to compensate for the loading attributed to a long conducting cable. Consequently, the resultant voltage drop in a received function command can lead to an erroneous interpretation of such command.

Figure 3:
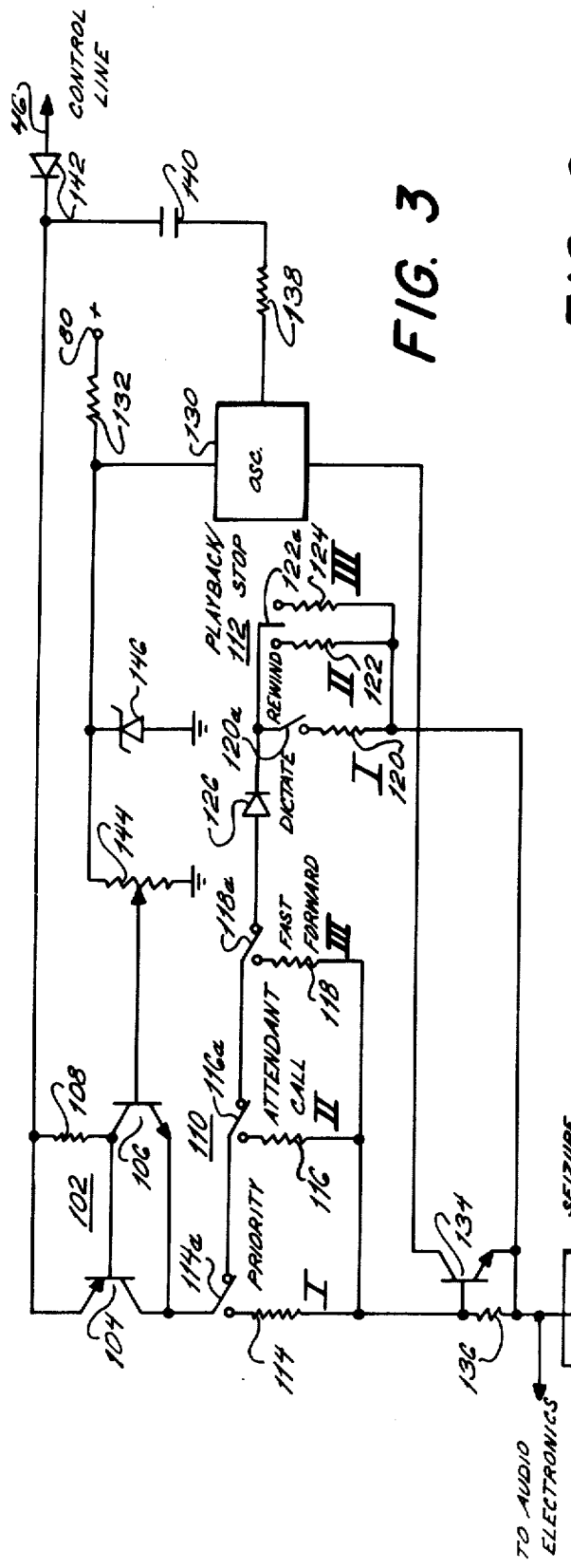
FIG. 3 is a schematic illustration of a control function current generator in accordance with the present invention.

Therefore, in accordance with one feature of the present invention, control signals representing function commands are produced in the form of constant currents of predetermined magnitudes, wherein a particular current magnitude is used as a command for a corresponding function. The function control coding circuit which is used in accordance with this feature is illustrated in FIG. 3. This circuit is adapted to transmit constant currents over the control line 46 and is comprised of a constant current source 102, a first set of resistors 110 coupled to the constant current source, and a second set of resistors 112 connected to the constant current source and a tone oscillator 130. In one typical embodiment, the constant current source 102 is comprised of complementary transistors 104 and 106 interconnected such that the collector electrode of the transistor 106 is connected to the base electrode of the transistor 104 and the collector electrode of the transistor 104 is connected to the emitter electrode of the transistor 106. Of course, other embodiments can be used if desired. A resistor 108 connects the collector electrode of the transistor 106 to the emitter electrode of the transistor 104 and, further, to the control line 46 through the diode 142. If the transistor 104 is a pnp transistor and the transistor 106 is an npn transistor, then current is seen to flow through the control line 46, through the diode 142 and through the interconnected transistors 104 and 106 to the junction defined by the common-connected collector and emitter electrodes. This junction is connected to the first set of resistors 110 through the series-connected switches 114a, 116a and 118a, and is further connected through a diode 126 to the second set of resistors 112 via the parallel-connected switches 120a and 122a. As shown, if each of the switches 114a, 116a and 118a remains in its illustrated opened state, a conducting path extends from the constant current source 102 through the diode 126 to the second set of resistors 112. However, if any one of the switches 114a, 116 or 118a is closed, such conducting path is interrupted.

The first set of resistors 110 is comprised of a plurality of resistors 114, 116 and 118 which are adapted to be connected to the respective switches 114a, 116a and 118a so that an individual one of these resistors will thus be connected in series with the constant current source 102. For example, if the switch 114a is closed, then the resistor 114 is connected to the constant current source 102 and, moreover, in view of the series-connection of the switches 114a, 116a and 118a, no other resistor can then be concurrently connected to the constant current source. Similarly, if the switch 116a is closed such that the resistor 116 is connected in series with the constant current souroce 102, then a conducting path cannot be extended from the constant current source to the switch 118a and, therefore, the resistor 118 cannot concurrently be connected to the constant current source. However, should the switch 114a now be closed, the previous connection of the resistor 116 to the constant current source 102 will be interrupted and the resistor 114 thus will be connected to the constant current source. It therefore is apparent that the switches 114a, 116a and 118a are coupled to the constant current source 102 in a predetermined hierarchy such that the closure of certain ones of these switches will override a previous closure of other switches.

The switch 118a not only serves to selectively connect the resistor 118 to the constant current source 102 but, additionally, serves to connect the second set of resistors 112 to the constant current source. The second set of resistors is comprised of a resistor 120 which is adapted to be connected in series with the constant current source 102 by a switch 120a. Additional resistors 122 and 124 are adapted to be selectively connected in series with the constant current source by the particular operating state of a switch 122a. For example, if the switch 122a is a single-pole/double-throw switch, then the resistor 122 will be connected to the constant current source when the switch 122a is in a first position and the resistor 124 will be connected to the constant current source when the switch is in a second position. The switch 122a also has a neutral, or isolated, position. It will, of course, be apparent that the operation of the switches 120a and 122a will have no effect upon the constant current source unless all of the switches 114a, 116 and 118a are opened, as illustrated.

The resistance values of the resistors 114 and 120 are selected to be equal. Also, the resistors 116 and 122 are of equal resistance value. Finally, the resistors 118 and 124 are of equal value. Thus, as is recognized, when the resistor 114 or the resistor 120 is connected in series with the constant current source 102, the same constant current of a first predetermined magnitude will be caused to flow in the control line 46. Similarly, if either the resistor 116 or the resistor 122 is connected in series with the constant current source, the same constant current of a second predetermined magnitude will be caused to flow in the control line. Finally, if either the resistor 118 or the resistor 124 is connected in series with the constant current source, the same constant current of a third predetermined magnitude will be caused to flow in the control line.

Because of the particular hierarchy of interconnections between the switches 114a, 116a and 118a, only a single one of the first set of resistors can be connected to the constant current source 102 at any given time. Thus, there is no ambiguity in the generation of a constant current if two of these switches are closed at any given time. This is because the switch associated with a higher position in the hierarchy will override a previously closed switch associated with a lower hierarchial position. Although the switches 120a and 122a can be similarly interconnected in a prearranged order of hierarchy, the switch 120a and the resistor 120 are illustrated as being in parallel with the switch 122a and either of the resistors 122 and 124. It is thus possible for both of these switches to be closed without any overriding affects, resulting in the connection of parallel resistors to the constant current source. However, the resistance values of the resistors 120, 122 and 124 are selected such that the effective parallel resistance of the resistors 120 and 124 results in the generation of a constant current of approximately the same magnitude as that which would be generated only by the resistor 124. Similarly, the effective parallel resistance formed of the resistors 120 and 122 results in the generation of a constant current of a magnitude which is approximately the same as the magnitude of the constant current generated when only the resistor 122 is connected to the constant current source. Thus, the resistance values of the resistors 120, 122 and 124 are selected in a hierarchial order to prevent any ambiguity in the constant current generated by the constant current source.

The resistors 114, 116 and 118 included in the first set of resistors are connected in common to the base electrode of a switching transistor 134 and thence through a base biasing resistor 136 to ground through the seizure switching circuit 54. The collector-emitter circuit of the switching transistor 134 serves to connect the tone oscillator 130 to ground through the seizure switching circuit. It is appreciated that, when current flows through the bias resistor 136, the switching transistor 134 is rendered conductive to thereby connect the tone oscillator 130 to a ground potential.

The tone oscillator 130 is supplied with an operating voltage from a suitable voltage supply 80 through a current limiting resistor 132. When operatively connected to the voltage supply, the tone oscillator generates an alternating signal of predetermined frequency. Accordingly, the tone oscillator 130 may comprise a conventional relaxation oscillator, a multivibrator, or other free running circuit capable of generating a predetermined tone frequency. The output of the tone oscillator 130 is connected through a resistor 138 and the capacitor 140 to the diode 142 so as to superimpose a tone signal onto the constant current flowing in the control line.

A bias circuit formed of the parallel combination of a potentiometer 144 and a zener diode 146 is connected to the constant current source 102 for the purpose of insuring that an equal voltage is applied across any of the resistors 114, 116 and 118, regardless of the particular switch which is closed. Accordingly, this bias circuit is coupled to the voltage supply by the current limiting resistor 132. It should be recognized that the bias circuit is coupled to ground through the seizure switching circuit 54. The movable contact of the potentiometer 144 is connected to the base electrode of the transistor 106 and is adjusted to obtain the aforenoted equal voltage across each of the selected resistors. It is recognized that, if a constant voltage is applied across a resistor, the current flowing therethrough is then determined by the resistance value. Hence, since a constant voltage is insured across any one of the resistors to be selected, the resultant constant current which is caused to flow in the control line 46 is a function of the resistance value of the particular resistor which is selected.

Although all of the illustrated switches may be of identical construction, in one embodiment the switches 114a, 116a and 118a are formed as push button switches. If desired, these push button switches may be interlocked to insure that only a single one can be operatively depressed at any given time. The switch 120a may be a spring biased push button switch which is normally biased to its open condition. The switch 122a, in addition to comprising a single-pole/double-pole switch having a neutral position, may also be formed as a toggle-type switch.

Where a remote dictate station includes a handset and a cradle support structure, the switches 114a, 116a and 118a may be disposed on the cradle support structure; and the switches 120a and 122a may be disposed on the handset. Of course, the particular locations and types of switches employed may be selected as desired and form no part of the present invention per se.

As a typical example, the switch 120a may be designated the DICTATE switch such that, when closed, a dictate operation is selected. Of course, as is apparent, the actual generation of a dictate function control current is dependent upon whether the switches 114a, 116a and 118a are all open. The switch 122a may be designated the REWIND/PLAYBACK/STOP switch. This switch, when connected to the resistor 122, results in the generation of a current representing a rewind function command. When the switch 122a connects the resistor 124 to the constant current source 102, a constant current representing a stop or a playback function command is generated. The dual results attained through this resistor 124 will be described in geater detail hereinbelow.

The switch 114a is designated the PRIORITY switch which causes a constant current representing a transfer function command to be generated when this switch is closed. The switch 116a is designated the ATTENDANT CALL switch which causes a constant current representing an attendant call function command to be generated when closed. Finally, the switch 118a is designated the FAST FORWARD switch which cause a constant current representing a fast forward function command to be generated when closed.

Briefly, the operation of the illustrated function control coding circuit is such that the constant current source 102 is not capable of generating a constant current unless a reference potential, such as ground, is connected to the circuit. It is recalled that ground potential cannot be applied to this circuit until the seizure switching circuit 54 is closed. Thus, the function control coding circuit is effectively inoperative until the remote dictate station at which this circuit is positioned has gained access to the record/reproduce station.

When ground potential is coupled to this circuit, a constant current of predetermined magnitude is generated depending upon the closure of a particular switch. Of course, if no switch is closed, then zero current is generated. If any one of the first set of switches is closed, a constant current having a magnitude determined by the particular resistor connected in series with the constant current source 102 is caused to flow through the control line 46, through the diode 142, through the constant current source 102, through the selected resistor and through the base bias resistor 136 to ground. As a consequence of the current flowing through this base bias resistor, the switching transistor 134 is energized to couple the tone oscillator 130 to ground. Thus, when any one of the first set of switches is closed, a corresponding constant current source is generated and the tone signal produced by the oscillator 130 is superposed thereon.

When any one of the second set of switches is closed, a constant current having a magnitude determined by the particular resistor connected to the constant current source 102 is caused to flow through the control line 46, the diode 142, the constant current source 102, the diode 126 and the particularly selected resistor to ground. It is seen that the constant current flowing through the selected one of the second set of resistors does not flow through the base bias resistor 136. Consequently, the switching transistor 134 is not energized and ground potential is not coupled to the tone oscillator 130. Hence, when any one of the second set of swtiches is closed, a constant current flows and no tone signal is superposed thereon. Hence, the presence or absence of the tone signal is seen to result in twice the number of function control commands which can be generated without requiring a corresponding number of control currents. In the illustrated example, three predetermined currents can be used to select six discrete functions. Of course, if desired, the first and second sets of resistors all can be differently valued so that six predetermined constant currents will be generated to control six corresponding functions. However, as is recognized, an increase in the number of current levels which are used correspondingly reduces the range of permitted variation of each current level. This, in turn, requires that current detecting apparatus of higher resolution be used at the record/reproduce station.

Since current flows through the base-emitter junction of the switching transistor 134 when any one of the first set of switches is closed, but current does not flow through this junction when any one of the second set of switches is closed, the diode 126 is provided to simulate this base-emitter voltage drop when current flows through the second set of resistors. Thus, the predetermined currents which flow in response to the selection of any one of the resistors 114, 116 and 118 are equal to the predetermined currents which flow in response to the selection of any one of the resistors 120, 122 and 124, respectively. Of course, a control function current which is generated when the switches 120a or 122a are closed will be overriden by the closing of any one of the switches 114a, 116a or 118a. Similarly, the closure of the switch 116a will override a previous closure of the switch 118a and a closure of the switch 114a will override a previous closure of the switch 116a. Accordingly, constant currents of predetermined magnitudes are caused to unambiguously flow through the control line 46 in accordance with the particular function switch which is closed by an operator at a remote dictate station.

Function Decoding Circuit

Figure 4:
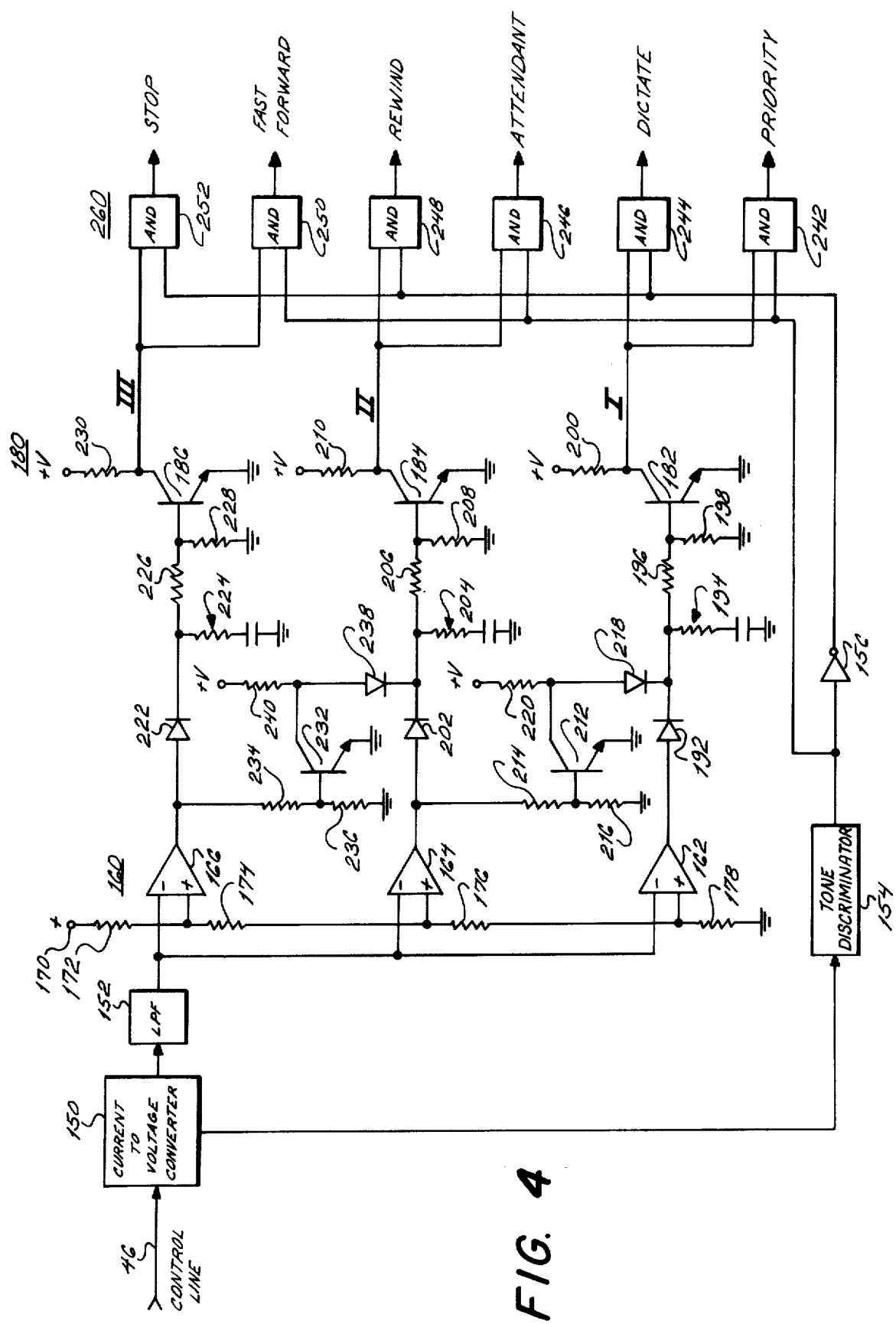
FIG. 4 is a schematic illustration of a current decoder for use with the generator of FIG. 3.

The predetermined constant currents and superposed tone signal transmitted to the record/reproduce station by the function control coding circuit at a remote dictate station is detected and decoded by the function decoding circuit schematically illustrated in FIG. 4. This circuit is comprised of a current-to-voltage converter 150, a tone separator 154, a threshold detecting circuit 160, an output signal generating circuit 180 and logic gating circuitry 260. The current-to-voltage converter 150 is adapted to convert a DC current into a DC voltage of corresponding mangitude. Such converting circuits are well known to those of ordinary skill in the art and further description thereof need not be provided. Suffice it to say that a voltage is produced by the converting circuit 150 having a magnitude which is a direct function of the magnitude of the constant current transmitted to the record/reproduce station. Hence, predetermined voltages are derived which represent the aforedescribed control function commands. As will be explained hereinbelow, such output voltages are processed to produce control signals which are used to control various functions at the record/reproduce station to facilitate a dictation or playback operation.

The DC voltage output derived by the current-to-voltage converter 150 is separated from the received superposed tone signal by a low pass filter 152 and is supplied to the threshold detecting circuit 160. The low pass filter 152 is adapted to permit a DC voltage to be transmitted therethrough, but sufficiently attenuates the higher frequency tone signal.

The tone detecting circuit which, for example, may comprise a tone discriminator 154, is also coupled to the current-to-voltage converter 150 and is adapted to detect the received tone signal. The tone discriminator 154 serves to produce an output DC signal of a first magnitude and/or polarity when a tone signal is detected and a DC voltage of another magnitude and/or polarity when a tone signal is not detected. For the purposes of establishing a consistent convention throughout, it here will be assumed that a relatively higher level DC signal is produced when a tone signal is detected and a relatively lower level DC signal is produced when a tone signal is not detected. Further in accordance with this convention, the higher level DC signal will be designated a binary "1" and the lower level DC signal will be designated a binary "0". Of course, if desired, a binary 1 may be represented by a positive signal and a binary 0 may be represented by a negative signal. In addition, the aforenoted representations corresponding to a binary 1 and a binary 0 may be interchanged, if desired. Those of ordinary skill in the art will recognize that conventional logic circuits are commerically available to operate with the various binary signals just described.

The threshold detecting circuit 160 is adapted to sense the relative magnitude of the DC voltage supplied from the current-to-voltage converter and to produce an output signal corresponding to such sensed voltage level. Accordingly, the threshold detecting circuit is comprised of a plurality of threshold detectors 162, 164 and 166 connected in common to the current-to-voltage converter through the low pass filter 152. Each threshold detector is capable of comparing the voltage applied thereto to a predetermined reference voltage. A resistance voltage divider network is connected to a source of reference voltage and is adapted to divide this reference voltage to obtain successively lower reference levels. Accordingly, resistors 172, 174, 176 and 178 are connected in series to the source of reference voltage and each junction defined by adjacent series-connected resistors is connected to a corresponding threshold detector to thereby supply a reference level thereto. Thus, the threshold detector 162 is supplied with the lowest reference level, the threshold detector 164 is supplied with a higher reference level and the threshold detector 166 is supplied with the highest reference level.

Each of the individual threshold detectors preferably comprises a comparison circuit such as a differential-type amplifier. A conventional differential amplifier includes positive and negative input terminals and is adpated to provide an output voltage having magnitude and polarity dependent upon the difference between the voltages applied to the respective input terminals. For example, a positive output voltage is produced if the input voltage applied to the positive input terminal is greater than the input voltage applied to the negative input terminal. Conversely, a negative output voltage is produced if the voltage applied to the negative input terminal exceeds the voltage applied to the positive input terminal. The threshold detectors 162, 164 and 166 are preferably formed of such differential amplifiers. The reference levels produced by the voltage divider network are supplied to the respective positive input terminals of the differential amplifiers and the voltage produced by the current-to-voltage converter is supplied to each of the negative input terminals. Hence, when the voltage produced by the converter 150 exceeds the reference threshold level, the output voltage produced by the corresponding differential amplifier is changed from a positive to a negative voltage. Of course, if desired, the converse may obtain.

The threshold detecting circuit 162 is connected to the output signal generator 180. The purpose of the output signal generator is to produce output signals of suitable magnitude and polarity in response to the sensed level of the voltage produced by the current-to-voltage converter 150, the output signals corresponding to a binary 1 or 0 which is compatible with the logic gating circuit 260 to cause suitable control signals to be generated. The output signal generator 180 comprised of a plurality of transistors 182, 184 and 186, each including a base electrode coupled to a corresponding threshold detector 162, 164 and 166, respectively. In particular, the threshold detector 162 is connected through a diode 192 and a voltage divider comprised of resistors 196 and 198 to the base electrode of the transistor 182. In addition, an R-C delay circuit 194 is connected between the cathode of the diode 192 and ground. Operating current is supplied to the transistor 182 from a suitable source of operating potential +V through a current limiting resistor 200 to the collector electrode of the transistor.

The base electrode of the transistor 184 is similarly connected to the output of the threshold detector 164 through a diode 202, a voltage divider network formed of the resistors 206 and 208 and an R-C delay circuit 204. In a similar fashion, the transistor 186 is connected to the output of the threshold detector 166 through a diode 222, a voltage divider circuit formed of the resistors 226 and 228 and a delay circuit 224.

It is appreciated that, if the voltage produced by the current-to-voltage converter 150 exceeds the reference threshold level applied to the threshold detector 164, then it will also exceed the reference threshold level applied to the threshold detector 162, thereby causing negative output voltages to be produced by both threshold detectors. Similarly, if the reference threshold voltage applied to the threshold detector 166 is exceeded, all reference threshold levels will be exceeded. It is preferable to inhibit the output voltage produced by the threshold detector associated with the next lowest reference threshold level from being applied to its output signal generator when an output voltage is produced by the threshold detector associated with the adjacent, next higher reference threshold level. To this effect, a switching transistor 212 is connected to the cathode of the diode 192 and is adapted to supply a positive voltage thereto when the threshold detector 164 produces an output voltage of negative polarity. Accordingly, the collector electrode of the transistor 212 is connected through a diode 218 to the cathode of the diode 192. The collector electrode is additionally connected through a collector resistor 220 to a source of operating potential +V. The base electrode of the transistor 212 is connected to a voltage divider circuit formed of the resistors 214 and 216 which extend between the output of the threshold detector 164 and ground. A similar switching transistor 232 is connected to the cathode of the diode 202 and is adapted to apply a positive voltage thereto when the threshold detector 166 produces an output voltage of negative polarity. Accordingly, the collector of the transistor 232 is connected through a diode 238 to the cathode of the diode 202 and, additionally, is connected through a collector resistor 240 to a source of operating potential +V. The base electrode of the transistor 232 is connected to a voltage divider circuit formed of the resistors 234 and 236 which are connected between the output of the threshold detector 166 and ground.

As will be described in detail hereinbelow, the transistor 182 is adapted to produce a binary 1 or 0 in accordance with the output voltage supplied thereto by the threshold detector 162. This binary 1 or 0 serves to determine the control signal produced by the gating circuit 260. Accordingly, the collector electrode of the transistor 182 is connected in common to the coincidence circuits 242 and 244 included in the gating circuit 260. A typical coincidence circuit is formed of an AND gate which is adapted to produce a binary 1 output only if each input thereto is supplied with a binary 1. If this condition is not satisfied, the AND gate produces an output binary 0. As shown, the AND gate 242 includes another input connected to the output of the tone discriminator 154. The AND gate 244 include another input which is connected through an inverting circuit 156 to the tone discriminator 154. An inverting circuit is a conventional logic signal inverter which produces a binary 1 output is response to a binary 0 input and, conversely, produces a binary 0 output in response to a binary "1" input. If desired, the inverting circuit 156 may comprise a conventional inverting amplifier.

The gating circuit 260 further includes AND gates 246 and 248 which include first inputs connected in common to the transistor 184 and second inputs which are connected to the tone discriminator 154 and to the inverting circuit 156, respectively. The gating circuit 260 also includes AND gates 250 and 252 which include first inputs connected in common to the transistor 186 and second inputs which are connected to the tone discriminator 154 and the inverting circuit 156, respectively.

As will now be described, the illustrated function decoding circuit is adapted to selectively produce control signals which respectively control the performance of dictate, rewind/playback, stop/playback, priority, attendant call and fast forward operations. These control signals are produced as a function of the magnitude of the constant current transmitted to the record/reproduce station and, additionally, are determined by the presence or absence of a superposed tone signal. Let it initially be assumed that an operator at the remote dictate station wishes to perform a dictate operation. By suitable operation of the aforedescribed function control switches, such as by closing the switch 120a in FIG. 3, a constant current having, for example, the lowest current level, is transmitted over the control line 46. Also, this current is not accompanied by a superposed tone signal.

The current received at the record/reproduce station is applied to the current-to-voltage converter 150 and is converted to a voltage having a corresponding magnitude. This voltage magnitude, which is here assumed to be the lowest magnitude, is supplied through low pass filter 152 to each of the threshold detectors 162, 164 and 166. It will be appreciated that this voltage exceeds only the reference threshold level which is applied to the threshold detector 162. It should be noted that, before any current is supplied to the current-to-voltage converter, each of the threshold detectors 162, 164 and 166 produces a positive output voltage. This positive output voltage is supplied through each of the diodes 192, 202 and 222 to the transistors 182, 184 and 186, respectively. As a result of this supplied positive output voltage, each transistor is rendered conductive so that a binary 0 is produced at each collector electrode. Consequently, each AND gate included in the gating circuit 260 produces a binary 0 control signal. However, since the reference threshold level associated with the threshold detector 162 is now exceeded, this threshold detector will produce a negative output voltage. As is appreciated, such a negative output voltage is not capable of maintaining the transistor 182 in its conducting state. Consequently, the voltage provided at the collector electrode of this transistor now rises to correspond to a binary 1 which is supplied to the common-connected inputs of the AND gates 242 and 244. However, at this time, the threshold detectors 164 and 166 continue to produce positive output voltages, resulting in the conduction of the transistors 184 and 186.

Since a dictate function has been selected, a superposed tone signal is not provided. Consequently, the output of the tone discriminator 154 is a relatively low voltage which, after being inverted by the inverting circuit 156, causes a binary 1 to be supplied to the second input of the AND gate 244. As a consequence thereof, the AND gate 244 is the only circuit which produces a binary 1 output, corresponding to a dictate control signal. Of course, if, instead of closing the switch 120a, the switch 114a at the function control coding circuit was closed, the same current level would be supplied to the current-to-voltage converter 150, but now a tone signal would be superposed thereon. This tone signal, would, of course, be detected by the tone discriminator 154 to supply a binary 1 to the AND gate 242 and to the inverting circuit 156. Hence, although the transistor 182 would, in this case, supply a binary 1 to the common-connected inputs of the AND gates 242 and 244, only the AND gate 242 is supplied with a binary 1 at its second input, thereby resulting in the production of a priority control signal.

Let it now be assumed that a constant current flowing through the control line 46 exhibits the next higher magnitude. As is appreciated, this control current can be produced by closing the switch 122a in FIG. 3 to connect the resistor 122 to the constant current source 102 or by closing the switch 116a. Depending upon which switch is closed, a rewind or attendent call function is selected. As is appreciated, the presence or absence of a superposed tone signal indicates which of these control functions has been selected. In either event, the voltage now applied to the threshold detecting circuit 160 by the current-to-voltage converter is high enough to exceed the reference threshold level applied to the threshold detector 164 as well as the reference threshold level applied to the threshold detector 162. Consequently, both of these threshold detectors now produce negative output voltages.

The negative output voltage produced by the threshold detector 164 is applied to the base electrode of the transistor 212, thereby rendering this transistor nonconductive. Accordingly, the potential appearing at the collector electrode of this transistor now rises toward the level +V and is supplied by the diode 218 to the cathode of the diode 192. Since the threshold detector 162 is also producing a negative output voltage, it is recognized that the diode 192 is reverse biased so that the positive voltage supplied by the collector of the transistor 212 is coupled to the base electrode of the transistor 182, thereby driving that transistor into its conducting state. Consequently, a binary 0 is produced by the transistor 182; but since the threshold detector 164 produces a negative output voltage, the transistor 184 is driven out of its conducting state in response to such negative voltage to thereby apply a binary 1 to the common-connected inputs of the AND gates 246 and 248. If no tone had been superposed on the constant current, indicative of a rewind function, then a binary 1 is supplied to the AND gate 248 by the inverting circuit 156 to thereby produce a rewind control signal. However, if the attendant call function had been selected, then a superposed tone signal is received and is detected by the tone discriminator which supplies a binary 1 to the AND gate 246, resulting in the production of the attendant call control signal.

Since the reference threshold level applied to the threshold detector 166 has not been exceeded at this time, it is seen that this threshold detector produces a positive output voltage which renders conductive the transistor 186 and also the transistor 232. Hence, at this time, the potential at the collector electrode of the transistor 232 is not sufficient to prevent the negative output voltage produced by the threshold detector 164 from being supplied to the transistor 184.

However, if the current flowing through the control line 46 now is assumed to exceed the highest reference threshold level, corresponding to the selection of a stop/playback or the selection of a fast forward function, then the voltage now applied to all of the threshold detectors by the current-to-voltage converter will exceed all of the reference threshold levels. Consequently, all of the threshold detectors will produce negative output voltages. However, as in the previously described operation, the collector of the transistor 212 supplies a positive voltage to reverse bias the diode 192, thereby inhibiting the negative output voltage produced by the threshold detector 162 from being supplied to the transistor 182. Now, in a similar fashion, the negative output voltage by the threshold detector 166 is supplied to the transistor 232 to bias this transistor to its nonconductive state. Accordingly, the potential at the collector electrode of the transistor 232 rises to a relatively high positive level and is supplied by the diode 238 to reverse bias the diode 202. Consequently, the negative output voltage produced by the threshold detector 164 is inhibited from being supplied to the transistor 184. Accordingly, only the transistor 186 is now rendered nonconductive. Thus, a binary 1 is supplied by this transistor to the common-connected inputs of the AND gates 250 and 252. If a stop/playback function had been selected, then no tone signal is superposed on the received control current and, consequently, the inverting circuit 156 supplies a binary 1 to the AND gate 252. As a consequence thereof, the stop/playback control signal is produced. However, if the fast forward function had been selected, then a superposed tone signal will be detected, resulting in a binary 1 supplied to the AND gate 250 by the tone discriminator 154. Hence, a fast forward control signal will be produced.

It is recognized that the tone discriminator includes a band pass filter which conventionally exhibits an intrinsic delay. Hence, a perceptible delay will be provided until the tone discriminator 154 produces a binary 1 in response to the sensed tone signal. However, since the DC operating circuits comprising the threshold detecting circuit 160 and the output signal circuit 180 operate with slight delays, it is recognized that it would be possible for a false control signal to be momentarily produced during the intrinsic delay of the band pass filter. For example, if a priority function is selected, because of the delay in the operation of the tone discriminator, it is possible that a binary 1 will be supplied to both inputs of the AND 244, resulting in a dictate control signal to be produced initially. Of course, such dictate control signal will be terminated and a priority control signal will be produced at the conclusion of the tone discrimintor operating delay. Nevertheless, in an effort to avoid this false production of control signals, the delay circuits 194, 204 and 224 are provided between the threshold detecting circuits 162, 164 and 166 and the transistors 182, 184 and 186, respectively. The purpose of these delay circuits is to effectively match the intrinsic delay of the tone discriminator 154. Thus, the transistors 182, 184 and 186 will not be selectively operated in response to the sensed current levels before the tone discriminator has had an opportunity to produce an output indicating the presence of absence of superposed tone. Hence, these delay circuits permit the tone discriminator to respond to the tone signal (if it is present) before a control signal can be produced.

Operation Control Logic

Figure 5:
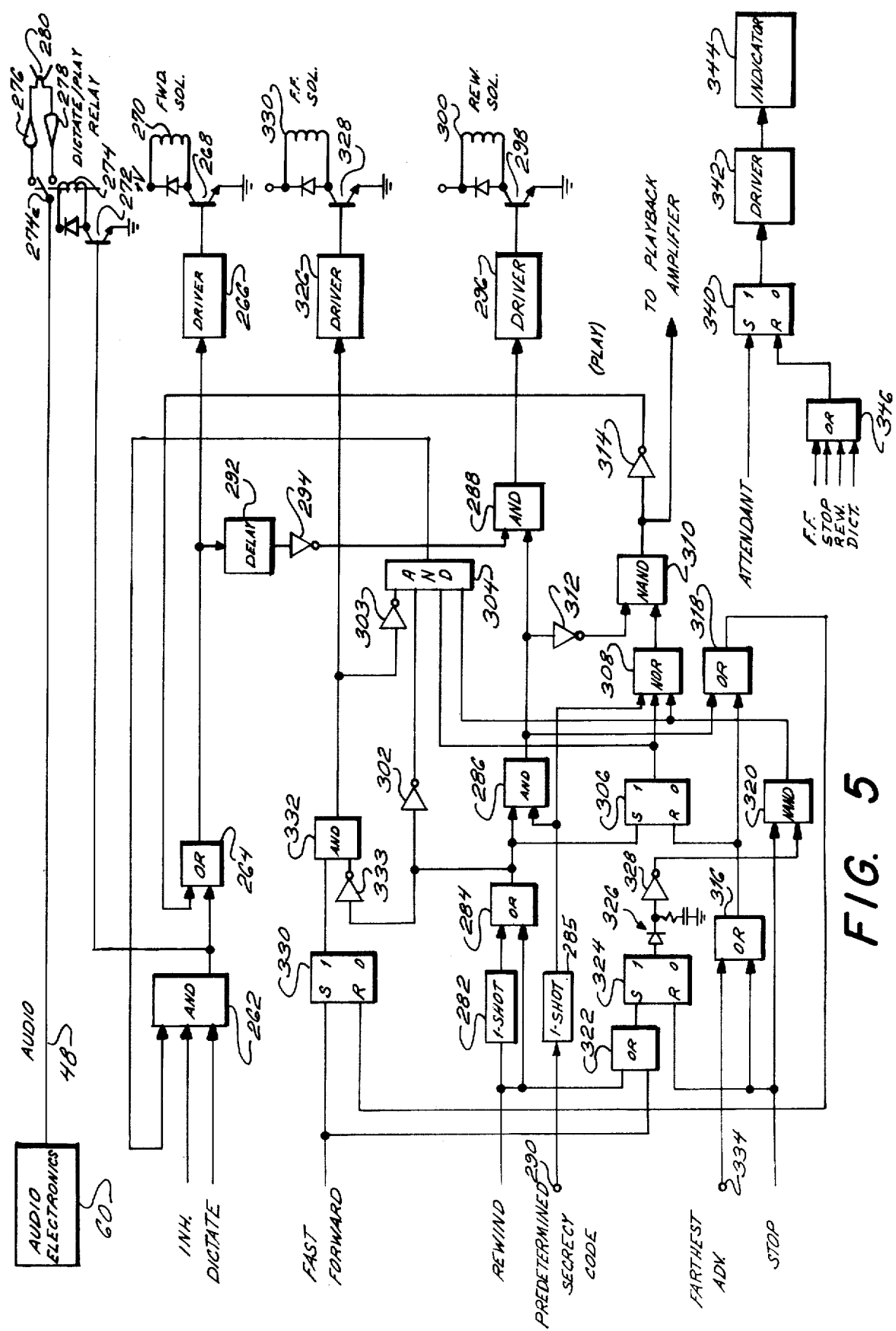
FIG. 5 is a logic diagram illustrating the function control apparatus which is used in the central dictation system illustrated in FIG. 1.

The control signals produced by the function decoding circuit are supplied to the operation control logic illustrated in FIG. 5 to thereby control the functional operations of the record/reprroduce station in accordance with the control currents generated at the remote dictate station. Accordingly, the operation control logic includes a dictate control circuit, a rewind control circuit, a stop control circuit, a playback control circuit and a fast forward control circuit.

The dictate control circuit is comprised of a coincidence circuit 262, a solenoid 270, solenoid energizing apparatus including a transistor driver circuit 266 and a transistor 268 and a dictate/playback relay 274. The coincidence circuit 262 may comprise a conventional AND gate similar to the type described hereinabove. The AND gate 262 includes a first input adapted to receive the aforedescribed dictate control signal, a second input adapted to receive an inhibit control signal from additional circuitry, not shown, and a third input adapted to receive an additional inhibit signal. The inhibit signal supplied from the inhibit circuitry (not shown) is normally a binary 1 unless specific conditions of the record/reproduce station are sensed which would preclude a successful dictation operation. For example, if the total dictate capacity of the magnetic tape at the record/reproduce station has been exausted, an inhibit signal represented by a binary 0 is supplied to the AND gate 262 to inhibit further dictation. Various other inhibit signals which are produced as a function of the condition of the record/reproduce station are, of course, generated.

The additional inhibit signal supplied to the AND gate 262 is produced by an AND gaate 304 to prevent the unintentional or accidental initiation of a dictate operation whem, for example, the record/reproduce station is in a fast forward mode, a rewind mode or a playback mode of operation. This will be described in greater detail hereinbelow.

The output of the AND gate 262 is coupled through an OR circuit 264 to the transistor driver circuit 266. This AND gate output is further coupled to a relay driver transistor 272. The purpose of the OR circuit 264 will soon become apparent. As is known, an OR circuit is a conventional logic circuit having plural inputs and wherein a predetermined output signal is produced when any one of the plural inputs is provided with a given signal. For the purpose of the present invention, the OR circuit 264 is adapted to produce a binary 1 at its output when any one of its inputs is supplied with a binary 1. Thus, a binary 0 is produced by an OR circuit only when each of its inputs is provided with a binary 0.

The transistor driver circuit 266 is optional and is adapted to respond to a binary 1 applied thereto to supply a bias voltage to the transistor 268 sufficient to render the transistor conductive. The collector electrode of the transistor 268 is connected through the solenoid energizing coil 270 of the FORWARD solenoid to a source of operating potential +V. A conventional damping diode is connected in parallel with the solenoid energizing coil. The emitter of the transistor 268 is connected to ground. As is appreciated, when the transistor 268 is actuated to its conducting state, current flows from the source of operating potential +V, through the solenoid energizing coil 270 and through the conducting transistor 268 to ground. The thus energized solenoid coil results in the actuation of the FORWARD solenoid, not shown, resulting in the forward movement, or advancement, of the magnetic tape at a relatively slow speed. This moves the tape past a record/playback head to permit audio signals to be recorded or reproduced depending upon the conditioning of the record/playback head.

The conditioning of the record/playback head is controlled by the dictate/playback relay comprised of the relay energizing coil 274 and relay contact 274a. The relay energizing coil 274 is connected in the collector circuit of the relay driver transistor 272 which, in turn, is coupled to the AND gate 262. It is recalled that, for the purpose of the present discussion, a binary 1 is represented by a relatively positive potential. Accordingly, the relay driver transistor 272 is adapted to be actuated in response to a binary 1 supplied thereto. If desired, a transistor driver circuit may be connected to the base electrode of the transistor 272.

The relay contact 274a is connected to the audio line 48 and, depending upon the energization of the relay energizing coil 274, is adapted to selectively engage a first stationary contact, hereinafter the DICTATE contact, or a second stationary contact, hereinafter the PLAYBACK contact. The DICTATE contact is connected through an audio amplifier 276 to the record/playback head 280 and is adapted to supply audio signals to the head for recording on the magnetic tape. Similarly, the PLAYBACK contact is connected through an audio amplifier 278 to the record/playback head 280 and is adapted to receive amplified audio signals recovered from dictated tape. Hence, depending upon the operation of the relay contact 274a, audio signals are selectively transmitted to the record/playback head 280 from the audio electronics 60 at a remote dictate station or audio signals are returned to the audio electronics from the record/playback head during a playback operation.

In addition to being connected to the transistor driver circuit 266, the OR circuit 264 is coupled to an AND gate 288 via a delay circuit 292 and an inverting circuit 294. This AND gate is, in turn, connected at its output through a driver circuit 296 to a transistor 298, the latter being connected to a REWIND solenoid energizing coil in its collector circuit. As will soon become apparent, the purpose of the delay circuit 292 and the inverting circuit 294 is to inhibit the immediate energization of the rewind solenoid coil 300 when the forward solenoid coil 270 had last been energized. Although not shown, the REWIND solenoid, when actuated, is adapted to permit tape rewinding apparatus to be operated which thus drives the magnetic tape in a reverse direction at a relatively fast speed. It is recognized that, if the FORWARD solenoid is energized to advance the tape and the REWIND solenoid is subsequently energized, the inherent delays attending solenoid operation could conceivably result in the simultaneous, albeit momentary, operation of the forward and rewind solenoids which could cause the tape to be stretched or broken. The delay circuit 292 inhibits this undesired result.

The other input of the AND gate 288 is coupled through an AND gate 286 and through an OR circuit 284 to a one-shot circuit 282. This one-shot circuit is adapted to respond to binary 1 applied thereto for generating an output pulse of predetermined duration. Accordingly, the one-shot circuit 282 may comprise a conventional monostable multivibrator or the like, and is adapted to be supplied with the rewind control signal. It will soon become apparent that the purpose of the one-shot circuit 282 is to insure that a predetermined minimum length of tape will be reversed even if a rewind control signal is only momentarily produced. Of course, if the rewind control signal admits of an extended duration, the tape should be reversed for the duration of the rewind control signal. Hence, the rewind control signal is additionally applied to another input of the OR circuit 284. It is seen that the OR circuit will produce a binary 1 at its output in response to either a rewind control signal or a pulse signal produced by the one-shot circuit. Moreover, this output binary 1 produced by the OR circuit will have a duration at least as great as the duration of the pulse produced by the one-shot circuit.

The AND gate 286, through which the output of the OR circuit 284 is connected to the AND gate 288, is provided to control the greatest length of tape which may be reversed. It is recalled that, after an operator at a dictate station has completed a dictation operation, a predetermined code will automatically be recorded at the immediate conclusion of the dictated message. This predetermined code serves as a secrecy code to prevent a subsequent dictator from reversing the tape to a point whereat the previously dictated message can be reproduced or erased. Accordingly, a tuned circuit, not shown, is provided and is coupled to the dictate/playback head to sense, during a rewind operation, when this recorded predetermined or secrecy code has been reached. Upon sensing such secrecy code, the output signal supplied to the terminal 290 is changed from a binary 1 to a binary 0. This signal change acts as a triggering input signal for a one-shot circuit 285 which, in turn, is connected to an input of the AND gate 286.

The output of the AND gate 286 is additionally coupled to an input of a NAND gate 310 by an inverting circuit 312. A NAND gate is a conventional logic element having a function which is somewhat the inverse of an AND gate. Thus, a NAND gate is adapted to produce a binary 0 at its output only if each input thereto is supplied with a binary 1. If any NAND gate input is supplied with a binary 0 the NAND gate produces a binary 1 in response thereto. The output of the NAND gate 310 is connected to the OR circuit 264 by an inverting circuit 314. The purpose of this NAND gate is to initiate a playback operation immediately following a rewind operation. To this effect, another input of the NAND gate is connected through a NOR circuit 308 to the 0 output of a flip-flop circuit 306.

A NOR circuit is a conventional logic element having a function substantially similar to that of a NAND gate. Hence, a NOR circuit is adapted to produce an output binary 0 only when each input thereto is supplied with a binary 1. If any NOR circuit input is provided with a binary 0, a resultant binary 1 is produced. The NOR circuit 308 includes additional inputs, one of which is connected to the aforedescribed terminal 290 and another of which is connected to the output of a NAND gate 320, to be described.

The flip-flop circuit 306 is a conventional set/reset flip-flop device, such as a bistable multivibrator, having set and reset input terminals and 1 and 0 output terminals. The flip-flop circuit is adapted to be set to a first condition in response to a binary 1 applied to its set input terminal. When set, the flip-flop circuit essentially stores the signal applied thereto and produces a binary 1 at its 1 output as an indication of such storage. As is known, when a binary 1 is produced at one output of a flip-flop, the other output thereof is provided with a binary 0. The flip-flop circuit 306 is adapted to be reset in response to a binary 1 supplied to the reset input thereof, resulting in a binary 1 at the 0 output thereof. As shown, the set input of the flip-flop circuit 306 is connected to the OR circuit 284 and the reset input is connected to an OR circuit 316.

The OR circuit 316 is adapted to be supplied with the stop control signal at a first input and, additionally, to be supplied with a farthest advance signal at its second input. Although not shown herein, the record/reproduce station includes a farthest advance circuit which is adapted to sense when the magnetic tape, after being reversed to some previously dictated position is then advanced to that point at which dictation previously was interrupted. This point is designated the farthest advance point because it is the farthest point at which the dictator had advanced the tape. A typical circuit adapted to control the tape movement apparatus in conjunction with this farthest advance function may be of the type described in U.S. Pat. No. 3,823,274. Suffice it to say that, when the farthest advance position has been reached, a binary 1 is supplied to the terminal 334 connected to the OR circuit 316.

In addition to being supplied to an input of the OR circuit 316, the stop control signal is supplied to an input of the aforementioned NAND gate 320 and, additionally, to the reset input of a flip-flop circuit 324. The flip-flop circuit 324 and the NAND gate 320 are included in a playback control circuit which is responsive to the stop control signal for advancing the magnetic tape at a relatively slow speed past the dictate/playback head. The playback control circuit further includes an OR circuit 322 having a first input adapted to receive the rewind control signal and a second input adapted to receive the fast forward control signal. The output of the OR circuit 322 is connected to the set input of the flip-flop circuit 324. The 1 output of the flip-flop circuit 324 is connected through a delay circuit 326 and inverting circuit 328 to another input of the NAND gate 320. The delay circuit is adapted to produce a binary 0 after a predetermined interval subsequent to the resetting of the flip-flop circuit 324. Accordingly, the delay circuit 326 may comprise an R-C circuit, a conventional delay line circuit, a one-shot circuit or the like. As will soon be described, the flip-flop circuit 324 is reset in response to a stop control signal applied to the reset input to thereby supply a binary 0 to the delay circuit 326. After the aforenoted delay, a tape playback operation is performed for as long as the stop control signal is produced.

The fast forward control circuit is comprised of a flip-flop circuit 330 having a set input adapted to receive the fast forward control signal and a reset input connected to an OR circuit 318. The OR circuit 318 includes a first input connected to the aforedescribed OR circuit 316 and a second input connected to the aforedescribed AND gate 286.

The 1 output of the flip-flop circuit 330 is connected through an AND gate 332 to a transistor driver circuit 326, the latter being connected to a transistor 328 which, in turn, has its collector electrode connected to a fast forward solenoid energizing coil 330. The AND gate 332 includes another input which is connected through an inverting circuit 333 to the aforedescribed OR circuit 284. As will be described, the receipt of a fast forward control signal will result in the energization of the FAST FORWARD solenoid which, in turn, operates fast forward tape moving apparatus to advance the magnetic tape in a forward direction at a relatively fast speed. Such fast forward apparatus may be of the type described in co-pending application Ser. No. 536,856, filed Dec. 27, 1974, now U.S. Pat. No. 3,934,774. This fast forward operation is maintained until a rewind control signal or a stop control signal is produced.

The aforementioned AND gate 304 is adapted to supply an additional inhibit signal to the AND gate 262 to insure that a dictate operation will be inhibited from accidentally being performed when a fast forward, rewind or playback operation is selected. Accordingly, the AND gate 304 includes a first input connected through an inverting circuit 303 to the output of the AND gate 332, a second input connected through the inverting circuit 302 to the output of the OR circuit 284, a third input connected to the 0 output of the flip-flop circuit 306 and a fourth input connected to the output of the NAND gate 320.

The operation of the control logic illustrated in FIG. 5 and thus far described now follows. Let it initially be assumed that the record/reproduce station is available for communicating with a remote dictate station, but that no remote dictate station has seized the record/reproduce station for a dictating or playback operation. Accordingly, the dictate/playback relay energizing coil 274 is de-energized so that the contact 274a of the dictate/playback relay connects the playback amplifier 278 to the audio line 48. Also, the rewind, forward and fast forward solenoids are all de-energized and none of the dictate, rewind, stop or fast forward control signals is produced.

Now, when a remote dictate station seizes the record/reproduce station, the audio line 48 is connected to the audio electronics 60 included in the remote dictate station, as previously described with respect to FIG. 2. If a dictate operation is to ensue, the appropriate function control switch at the dictate station is actuated and a constant current of magnitude corresponding to a dictate command is transmitted to the record/reproduce station where it is detected and decoded to produce the dictate control signal. Consequently, a binary 1 is supplied to the AND gate 262, corresponding to the dictate control signal. Let it now be assumed that conditions at the record/reproduce station are satisfactory to the recording of dictated information so that a binary 1 is supplied to the AND gate from the inhibit signal terminal connected thereto. Also, since neither a rewind, playback or fast forward operation is commanded, a binary 1 is supplied to the AND gate 262 by the AND gate 304. Hence, a binary 1 is produced by the AND gate 262 and is supplied to the relay coil energizing transistor 272 and, through the OR circuit 264 and transistor driver circuit 266 to the coil energizing transistor 268. The transistors 268 and 272 are both rendered conductive so that current flows through the forward solenoid energizing coil 270 and through the dictate/playback relay energizing coil 274. As a consequence thereof, the forward drive apparatus is actuated to advance the magnetic tape past the record/playback head 280 at the dictation transducer site at a relative slow speed and the contact 274a is switched so that the audio electronics 60 are connected, through the audio line 48, to the record amplifier 276 and then to the dictate/playback head 280. Hence, for the duration of the binary 1 produced by the AND gate 262, a dictate operation is executed.

When the operator at the remote dictate station deactuates the dictate function switch, as by releasing this switch, a dictate command current no longer is received at the record/reproduce station and a binary 0 now is supplied to the AND gate 262. As a result thereof, the AND gate produces and supplies a binary 0 to the transistors 268 and 272, thereby driving these transistors to their respective non-conductive states. Hence, the forward solenoid is de-energized to thereby halt the movement of magnetic tape and the dictate/playback relay also is de-energized to return the contact 274a to its initial position, whereby the audio electronics 60 are connected to the playback amplifier 278. It is, of course, understood that the foregoing termination of a dictate operation will occur if the inhibit signal terminal supplies a binary 0 to the AND gate 262 in response to the occurrence of predetermined conditions at the record/reproduce station.

Let it now be assumed that, after dictating information which is recorded on the magnetic tape, the operator at the remote dictate station wishes to review at least a portion of such recorded information. Accordingly, after releasing the dictate function switch, the rewind function switch is actuated, thereby causing a rewind command current to be transmitted to the record/reproduce station, whereat such current is detected and decoded to produce the rewind control signal. A binary 1 is thus applied to the one-shot circuit 282 and, additionally, to the OR circuit 284. The pulse of predetermined magnitude produced by the one-shot circuit in response to the binary 1 applied thereto is also supplied to the OR circuit 284. Thus, it is seen that the OR circuit 284 produces a binary 1 having a minimum duration equal to the pulse duration of the output pulse generated by the one-shot circuit 282. If the rewind command current is transmitted only momentarily, the binary 1 output of the OR circuit 284 will have the same duration as the one-shot circuit output pulse. However, if the rewind command current is transmitted for a longer period of time than this pulse duration, the binary 1 produced by the OR circuit 284 will exhibit a duration corresponding to the duration of the received rewind command current.

This binary 1 produced by the OR circuit 284 is inverted by the inverting circuit 302 and is supplied as a binary 0 to the AND gate 304, thereby inhibiting a spurious initiation of a dicate operation. The binary 1 produced by the OR circuit is also supplied to the AND gate 386 which normally responds thereto to produce a binary 1 when the aforenoted predetermined secrecy code recorded on the magnetic tape is not sensed. It is recalled that this code is automatically recorded on the magnetic tape at the conclusion of a dictate operation and thus precedes a subsequent dictate operation. For the case wherein the operator at the remote dictate station wishes to review the information which he has recorded on the magnetic tape, it is appreciated that a binary 1 will be supplied to the AND gate 286 by the terminal 290 when a rewind operation is initiated.

The binary 1 produced by the AND gate 286 is supplied to the AND gate 288 and, additionally, is inverted by the inverting circuit 312 to supply a binary 0 to the NAND gate 310 which, in turn, responds thereto to supply a binary 1 to the inverting circuit 314, this signal being inverted and supplied as a binary 0 to the OR circuit 264. Although not illustrated herein, the binary 1 produced by the NAND gate 310 is applied to the playback amplifier 278 to effectively mute the output audio signals derived from this amplifier during a rewind operation.

Since it has been assumed that the rewind command current is transmitted immediately after the termination of the dictate command, the binary 1 which previously had been produced by the OR circuit 264 during a dictate operation is changed to a binary 0 but, because of the delay imposed by the delay circuit 292, a binary 1 is still applied to the inverting circuit 294 for a given period of time. At the conclusion of this period of time, the inverting circuit 294 is supplied with a binary 0 and now applies a binary 1 to the AND gate 288. This AND gate now is supplied with a binary 1 at each input to thereby apply a binary 1 through the driver circuit 296 to the coil driving transistor 298. This transistor thus is rendered conductive to permit the rewind solenoid coil 300 to be energized. Corresponding rewind driving apparatus, not shown, is actuated to execute a rewind operation having a duration equal to at least the pulse duration of the output pulse produced by the one-shot circuit 282, but no greater than the duration of the received rewind command current. It is seen that the purpose of the delay circuit 292 is to provide sufficient time for the forward solenoid to be deactuated before the rewind solenoid is actuated. This prevents any possible simultaneous operation of the forward and rewind driving apparatus which could damage the magnetic tape.

When the rewind control signal is produced, the binary 1 supplied to the one-shot circuit 282 and the OR circuit 284 is additionally supplied through the OR circuit 322 to the set input of the flip-flop circuit 324, thus setting this flip-flip circuit to store an indication of the rewind control signal, thereby causing a binary 1 to be produced at the 1 output thereof. Also, the binary 1 produced by the OR circuit 284 in response to the rewind control signal is applied to the set input of the flip-flop circuit 306, thereby driving this flip-flop circuit to its set state and causing a binary 0 to be produced at the 0 output thereof.

If, during the aforenoted rewind operation, the tape is reversed to the point where the previously recorded predetermined secrecy code is sensed by the playback head 280, a resultant binary 0 is applied to the terminal 290 triggering the one-shot circuit 285 to supply a pulse (for example, a binary 0) of predetermined duration which deactuates the AND gate 286. When deactuated, this AND gate supplies a binary 0 to the AND gate 288, which, in turn, applies a binary 0 to the transistor 298, thereby causing the transistor to assume its nonconductive state and de-energizing the rewind solenoid energizing coil 300. It is therefore seen that when this predetermined secrecy code is detected, the rewind operation is terminated for a predetermined duration. In addition, the binary 0 pulse produced by the one-shot circuit 285 is received by the NOR circuit 308 which responds thereto to apply a binary 1 to the NAND gate 310. Also, the binary 0 produced by the AND gate 286 is inverted by the inverting circuit 312 and is supplied as a binary 1 to the other input of the NAND gate 310. As will soon be described, when the NAND gate 310 is supplied with a binary 1 at each input thereof, the magnetic tape is advanced past the dictate/playback head 280. By advancing the tape, for the duration of the one-shot circuit output pulse, the previously recorded predetermined secrecy code no longer will be detected, thereby causing a binary 1 to be applied to the terminal 290.

If, prior to reaching the point whereat the predetermined secrecy code is detected, the rewind command current is terminated, as by the deactuation of the rewind function switch, a binary 0 is supplied from the OR circuit 284 to the AND gate 286, thereby deactuating this AND gate and, consequently, de-energizing the rewind solenoid energizing coil 300, as described. Accordingly, the magnetic tape no longer is reversed past the dictate/playback head 280. However, since the flip-flop circuit 306 has assumed its set state in response to the initiation of a rewind operation, the binary 0 produced at the 0 output thereof is supplied to the NOR circuit 308 which is responsive thereto to apply a binary 1 to one input of the NAND gate 310. The deactuated AND gate 286 causes the inventing circuit 312 to supply a binary 1 to the other input of the NAND gate 310, thereby resulting in a binary 0 output from the NAND gate. This binary 0 is supplied to the playback amplifier 278 to "unmute" this amplifier so that subsequent audio signals recovered from the magnetic tape are sufficiently amplified. Also, the binary 0 produced by the NAND gate 310 is inverted by the inverting circuit 314 and is supplied as a binary 1 through the OR circuit 264 to the driver circuit 266, thereby driving the coil driving transistor 268 to its conductive state and acutating the forward solenoid. Thus, immediately after terminating the rewind command current, the magnetic tape is driven in a forward direction at the relatively slow speed past the dictate/playback head 280. Although not shown herein, if desired, a delay circuit may be interposed between the inverting circuit 314 and the OR circuit 264. Hence, the tape which had been reversed is now advanced and previously recorded information is recovered and amplified by the playback amplifier 278. The amplified audio signals are then transmitted through the contact 274a and through the audio line 48 to the audio electronics 60 at the remote dictate station. An operator now listens to the reproduced audio signals which he previously had recorded. An automatic playback operation ensues.

During this playback operation, the flip-flop circuit 306 admits of its set state, thereby supplying a binary 0 to the AND gate 304 which inhibits the AND gate 262 from actuating the transistor 272, and thus prevents an unintentional dictate mode from obtaining.

The automatic playback operation continues until the operator at the remote dictate station acutates the stop function switch or until the tape is advanced to the farthest point which had been reached previously. A stop command is represented by a momentary transmission of the stop command current which results in a momentary binary 1 applied to the OR circuit 316. It is recalled that, when the tape has been advanced to its farthest advance point (i.e., the farthest point which the dictator previously had reached) a binary 1 is applied to the terminal 334. Thus, when either the stop control signal is produced or the farthest advance point is reached, the OR circuit 316 applies a binary 1 to the reset input of the flip-flop circuit 306 and to the OR circuit 318. However, when the stop control signal is produced, a binary 1 additionally is supplied to the reset input of the flip-flop circuit 324.

The flip-flop circuit 306 is driven to its reset state in response to the binary 1 applied to its reset input to thereby produce a binary 1 at its 0 output. Accordingly, a binary 1 is applied to a first input of the NOR circuit 308 and the binary 1 which is normally applied to the terminal 290 is supplied to the second input of the NOR circuit 308. It is recognized that, before the stop control signal had been produced (or before the farthest advance point had been reached) a rewind control signal had been received. This control signal had been supplied as a binary 1 through the OR circuit 322 to the set input of the flipflop circuit 324, thereby disposing this flip-flop circuit in its set state, resulting in a binary 1 at its 1 output. This binary 1 produced by the flip-flop circuit 324, after passing through the delay circuit 326 is inverted by the inverting circuit 328 and is supplied as a binary 0 to the NAND gate 320, resulting in a binary 1 applied to the third input of the NOR circuit 308 by this NAND gate. Consequently, when the flip-flop circuit 306 is reset by the stop control signal or by the magnetic tape attaining its farthest advance position, a binary 1 is applied to each input of the NOR circuit 308, resulting in a binary 0 supplied to the NAND gate 310. This NAND gate responds to the binary 0 applied thereto to supply a binary 1 to the inverting circuit 314 which, in turn, applies a binary 0 to the OR circuit 264. Hence, the OR circuit 264 is supplied with a binary 0 at each input thereof, resulting in the deactuation of the transistor 268 and the de-energization of the forward solenoid energizing coil 270. Therefore, the advance of the tape attending a playback operation is halted.

Let it be assumed that, at the time the tape movement was stopped, the farthest advance position had not been reached and, therefore, the playback operation had been stopped by the operator at the remote dictate station who had actuated the stop function switch. Accordingly, the flip-flop circuit 306 had been reset in response to the stop control signal and, additionally, the flip-flop circuit 324 had been reset. Because of the delay imposed by the delay circuit 326, the inverting circuit 328 is supplied with a binary 1 for the delay time interval. At the conclusion of this interval, the binary 0 at the 1 output of the flip-flop circuit 324 finally is supplied to the inverting circuit 328. This results in a binary 1 supplied to one input of the NAND gate 320. Now, if the operator again actuates the stop function switch, another stop control signal is produced to thereby apply a binary 1 to the other input of the NAND gate 320. Thus, this subsequent operation of the stop function switch causes a binary 0 to be supplied to an input of the NOR circuit 308, resulting in a binary 1 applied to the NAND gate 310 by the NOR circuit. Since a rewind control signal is not present at this time, the AND gate 286 supplies to the inverting circuit 312 a binary 0 which is inverted and supplied as a binary 1 to the NAND gate 310. Hence, this NAND gate now is supplied with a binary 1 at each input thereof resulting in a binary 1 applied to the OR circuit 264 by the inverting circuit 314. Therefore, after the initial actuation of the stop function switch, it is appreciated that each subsequent actuation of that switch results in the actuation of the forward solenoid energizing coil driver transistor 268 which, in turn, energizes the forward solenoid to initiate a playback operation. When the stop function switch at the remote dictate station is released, the stop control signal is terminated which causes the NAND gate 320 to produce a binary 1. As is recognized, this serves to halt the movement of the magnetic tape past the dictate/playback head 280, thereby interrupting the playback operation. In this manner, the previously recorded tape is selectively advanced and stopped to effectuate a corresponding playback operation until a further function is to be performed. For example, if, after listening to previously dictated information, a further review of recorded information is desired, the rewind function switch will be actuated and the aforenoted rewind/playback operation will be initiated. Now, actuation of the stop function switch will have the same results as described in detail above.

Let it now be assumed that, after only a portion of previously dictated information is reviewed during a playback operation, the operate at the remote dictate station wishes to resume dictation. This can be implemented by operating the dictate function switch which results in the recording of audio information on the magnetic tape from the point which is then stopped at the dictate/playback head 280. Alternatively, if it is desired that dictation be resumed at the farthest advance point of the tape, the fast forward function switch at the remote dictate station is operated to thereby transmit a fast forward command current to the record/reproduce station whereat this current is detected and decoded into the fast forward control signal. Consequently, a binary 1 is applied to the set input of the flip-flop circuit 330, thereby disposing this flip-flop circuit in its set state and producing a binary 1 at its 1 output. Since a rewind control signal now is not present, a binary 0 is supplied to the inverting circuit 333 by the OR circuit 284, resulting in a binary 1 applied to the AND gate 332. It is appreciated that this AND gate now is supplied with a binary 1 at each input thereof, and now supplies a binary 1 through the driver circuit 326 to the driver transistor 328. This transistor is actuated and energizing current is permitted to flow through the fast forward solenoid energizing coil 330. As a result thereof, the fast forward solenoid is actuated and suitable tape driving apparatus, such as the type described in co-pending application Ser. No. 536,856, filed Dec. 27, 1974, now U.S. Pat. No.

3,934,774 is operated to advance the tape past the dictate/playback head 280 at the dictation transducer site at the relatively fast speed.

Since the flip-flop circuit 330 operates to store an indication of the fast forward control signal, the fast forward movement of the tape is continued even though the fast forward command current, and thus the fast forward control signal, is terminated. Now, when the farthest advance point of the tape is reached, a binary 1 is supplied to the terminal 334 and is transmitted by the OR circuits 316 and 318 to the reset input of the flip-flop circuit 330. This flip-flop circuit thus is reset to supply a binary 0 to the AND gate 332, resulting in the nonconduction of the transistor 328 and the de-energization of the fast forward solenoid energizing coil 330. The tape is thus halted at the point at which the previous dictation had been interrupted and further dictated information now can be recorded with satisfactory continuity.

If, before reaching the farthest advance point, the operator at the remote dictate station wishes to halt the fast forward movement of the tape, the stop function switch is actuated to thereby transmit the stop command current to the record/reproduce station whereat this current is detected and decoded to produce the stop control signal. Accordingly, a binary 1 is transmitted through the OR circuits 316 and 318 to the reset input of the flip-flop circuit 330, resulting in the same operation described above. At this point, the operator may resume dictation, may initiate a playback operation or may initiate a rewind/playback operation.

If a rewind/playback operation is desired, the rewind function switch is actuated, whereby the aforenoted operation attributed to the actuation of this switch is executed. If a playback operation is desired, it is appreciated that such operation is effected by actuation of the stop function switch. More particularly, when the fast forward control signal is produced, a binary 1 is applied to the set input of the flip-flop circuit 324 via the OR circuit 322. This flip-flop circuit admits of its set state similar to the set state obtained in response to the rewind control signal, as described hereinabove. Now, when the stop function switch is first actuated, the flip-flop circuit 330 is reset to halt the fast forward movement of the tape and, additionally, the flip-flop circuit 324 also is reset. However, because of the delay circuit 326, the flip-flop circuit 324 is unable to supply a binary 0 to the inverting circuit 328 at this time. But, when the stop function switch is subsequently actuated at a time following the intrinsic delay time of the delay circuit 326, the binary 0 now supplied to the inverting circuit 328 by the reset flip-flop circuit 324 is inverted and supplied as a binary 1 to a first input of the NAND gate 320 and the subsequently generated stop control signal is supplied as a binary 1 to the other input of the NAND gate 320. Hence, a playback operation is initiated as described in detail hereinabove.

Therefore, the fast forward operation can be automatically terminated when the magnetic tape is advanced to its farthest advance point or can be terminated at any intermediate position by the actuation of the stop function switch. Once the fast forward operation is terminated, any desired operational mode can be commenced by the judicious operation of the dictate function switch, the rewind function switch or the stop function switch.

As shown in FIG. 5, the operation control logic includes apparatus which is responsive to the attendant call control signal produced by the AND gate 246 of FIG. 4. This apparatus permits an operator at the remote dictate station to signal a supervisory operator at the record/reproduce station and to communicate with that supervisory operator. Accordingly, this function control apparatus is comprised of a flip-flop circuit 340 having a set input adapted to receive an attendant call control signal and a reset input adapted to receive a signal when particular functions, such as dictate, rewind, stop/playback or fast forward functions are to be performed. The flip-flop circuit 340 includes a 1 output connected through a driver circuit 342 to an indicator circuit 344. The indicator circuit is conventional and may comprise an audible indicator and/or a visual indicator. The driver circuit 342 is adapted to receive a logic signal, such as a binary 1, and to suitably drive the indicator circuit 344 in response thereto. The reset input of the flip-flop circuit 340 is connected to an OR circuit 346 having a first input connected to receive the dictate control signal, a second input connected to receive the rewind control signal, a third input connected to receive the stop control signal and a fourth input connected to receive the fast forward control signal.

In operation, it is appreciated that, when a dictate, rewind, stop, playback or fast forward mode of operation is selected, the flip-flop circuit 340 is supplied with a binary 1 at its reset input to thereby admit of its reset state. Hence, during a normal operation of the record/reproduce station in response to control signals derived from the actuation of suitable function control switches at the remote dictate station, the flip-flop circuit 340 normally is disposed in its reset state. Now, if the operator at the remote dictate station wishes to communicate with the supervisory operator at the record/reproduce station, the attendant call function switch at the dictate station is actuated, thereby resulting in the attendant call control signal produced at the record/reproduce station. This control signal serves to dispose the flip-flop circuit 340 in its set state, thereby causing the indicator circuit 344 to be energized. Hence, the supervisory operator is apprised that an operator at a remote dictate station seeks audible communication with the supervisory operator. Such communication is established via the audio line 48 through the audio electronics 60 at the remote dictate station and by compatible audio electronics, not shown, which may be switched to the audio line at the record/reproduce station. When a subsequent operational mode is commenced, the flip-flop circuit 340 is reset by the OR circuit 346. If desired, a manually operable switching device may be provided at the record/reproduce station to enable the supervisory operator to selectively reset the flip-flop circuit 340, when desired.

Transfer Mode Of Operation

A transfer control circuit is provided whereby a remote dictate station, such as dictate station 10, which is operatively connected to a record/reproduce station, such as station 18, can be transferred to a predetermined additional record/playback unit, such as the priority unit 30, to thereby enable the recording and almost immediate transcription of information which is deemed to have a high priority of importance.

It is recalled that the priority record/playback unit 30 exhibits the same relationship to the plural record/reproduce stations as a record/reproduce station exhibits with respect to the plural remote dictate stations.

Hence, a ground line, a privacy line, a control line and an audio line extend between the priority unit and each of the record/reproduce stations. Furthermore, any one of the record/reproduce stations is adapted to communicate with the priority unit provided that the priority unit is available for communication. The availability of the priority unit to communicate with a record/reproduce station is indicated by the voltage applied to the privacy line in the manner described hereinabove. As will soon become apparent, although the priority unit is operatively connected to communicate with a record/reproduce station, the record/reproduce station actually serves as a transmission terminal through which signals are transmitted between the priority unit and the remote dictate station which is communicating with the record/reproduce station. The various operating mechanisms included in such record/reproduce station are not electrically connected to the priority unit.

Figure 6:
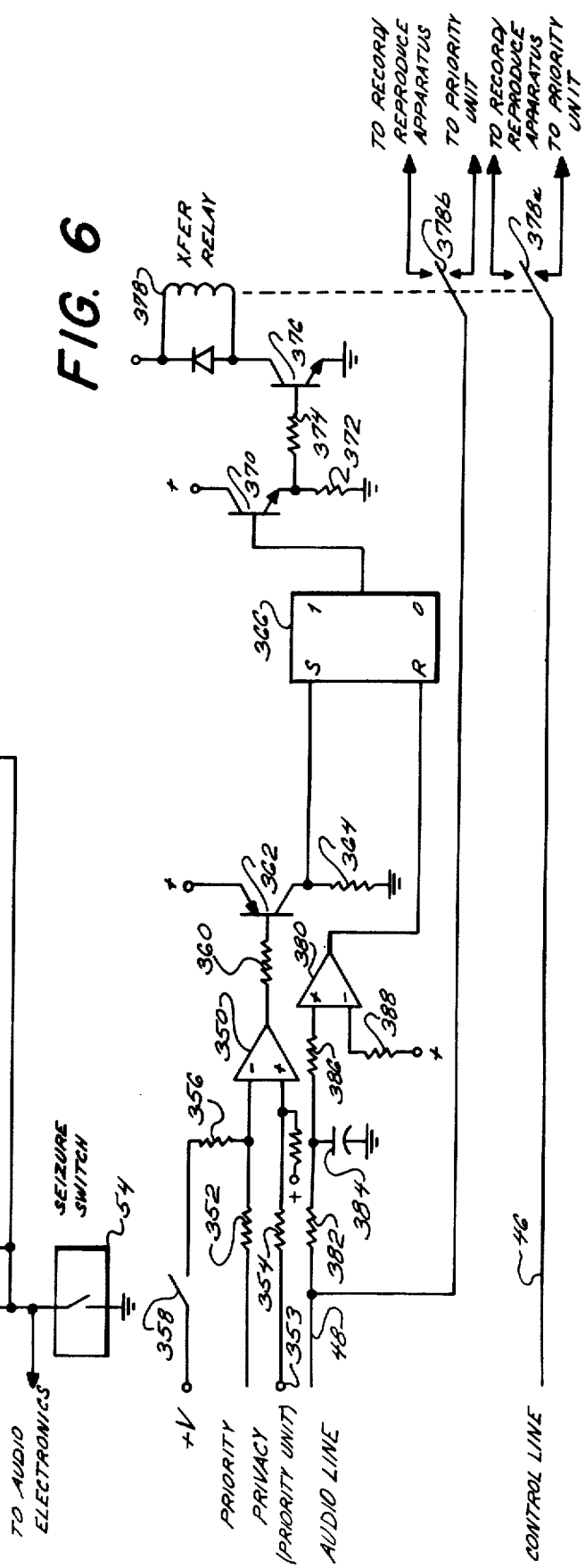
FIG. 6 is a schematic illustration of transfer control apparatus in accordance with an embodiment of the present invention.

The transfer control circuit which is adapted to effect a transfer between a remote dictate station and a record/reproduce station so that the remote dictate station now communicates with the priority unit is illustrated in FIG. 6 as comprising a comparator circuit 350, a flip-flop circuit 366, a transfer relay 78 and a detector circuit 380. The comparator circuit 350 is adapted to determine if the priority unit is available to communicate with a remote dictate station when the priority control signal is produced. Accordingly, the comparator circuit is comprised of a difference amplifier 350 having a negative input adapted to receive the priority control signal through an input resistor 352 and a positive input connected to a terminal 353 by an input resistor 354. The terminal 353 is adapted to receive a signal having a magnitude and/or polarity indicative of the availability of the priority unit to communicate with the remote dictate station. Accordingly, the terminal 353 may be connected to a privacy line so that a first voltage is applied thereto when the priority unit is available for communication and a second voltage different in magnitude and/or polarity is applied to the terminal 353 when the priority unit is not available for communication. Alternatively, logic control signals can be supplied through suitable condition detecting apparatus, not shown, so that, for example, a binary 0 is applied to the terminal 353 when the privacy unit is available for communication and a binary 1 is applied to the terminal when the privacy unit is not available for communication.

The negative input of the difference amplifier 350 is additionally connected through an input resistor 356 and a manually operable switch 358 to a source of operating potential +V. The switch 358 is adapted to be closed by a supervisory operator for those instances wherein system applications require that a transfer mode of operation can be effected only under the control of a supervisory operator.

The output of the difference amplifier is connected to a transistor 362 through an output resistor 360. This transistor is, for example, a pnp transistor having its emitter electrode connected to a suitable voltage source and its collector electrode connected to a reference potential, such as ground, by a collector resistor 364. The collector of the transistor 362 is additionally connected to the set input of the flip-flop circuit 366.

An indication of a transfer (or priority) control signal is adapted to be stored in the flip-flop circuit 366. When such a signal is stored, the flip-flop circuit is disposed in its set state, whereby a binary 1 is provided at the 1 output thereof. As shown, the 1 output of the flip-flop circuit 366 is connected to the base electrode of a transistor 370, the transistor being disposed in emitter-follower configuration. Accordingly, the emitter electrode thereof is connected to ground by an emitter resistor 372 and, additionally, to the base electrode of a relay coil driver transistor 376 by a resistor 374. A transfer relay energizing coil 378 is connected in the collector circuit of the driver transistor 376, together with a conventional damping diode. As will soon become apparent, the transfer relay energizing coil is energized when the flip-flop circuit 366 is disposed in its set state.

The reset input of the flip-flop circuit 366 is connected to a detecting circuit 380, the latter being adapted to detect when the remote dictate station which is transferred to the priority unit no longer is operated. It is recalled that, when a remote dictate station is operatively connected to a record/reproduce station, the audio switch 58 included in the dictate station is closed to thereby change the voltage level provided on the audio line 48. As a typical example, when the audio switch is closed, the voltage on the audio line is reduced by a predetermined amount. Conversely, when communication is completed and the audio switch 58 at the remote dictate station is opened, the voltage on the audio line 48 is increased by such predetermined amount. The detector circuit 380 is adapted to sense this DC voltage level provided on the audio line to thereby sense when the remote dictate station has completed its communication with the priority unit. Accordingly, the detector circuit 380 may comprise a difference amplifier having a positive input connected through a filter circuit to the audio line 48 and a negative input connected through an input resistor 388 to a reference voltage level. The illustrated filter circuit is a low-pass filter formed of a resistor 382 and a capacitor 384 connected between the resistor and ground. The junction defined by the resistor 382 and the capacitor 384 is connected through an input resistor 386 to the positive input of the difference amplifier 380. The purpose of the low-pass filter is to separate the DC voltage on the audio line 48 from the varying audio signals thereon and to supply only the DC voltage to the difference amplifer.

The control line 46 from the remote dictate station is connected through a relay contact 378a so as to be selectively connected to either a record/reproduce station or to the priority unit, depending upon the energization of the transfer relay energizing coil 378. When the relay energizing coil is de-energized, the relay contact 378a connects the control line 46 to the record/reproduce apparatus included in a record/reproduce station. Similarly, the audio line 48 from a remote dictate station is connected to the relay contact 378b which is adapted to selectively connect the audio line to the record/reproduce apparatus included in a record/reproduce station or to the priority unit. The particular operation of the relay contact 378b is dependent upon the energization of the relay energizing coil 378. When this coil is de-energized, the relay contact 378b connects the audio line 48 to the record/reproduce apparatus included in the record/reproduce station.

It should be apparent that the transfer control circuit illustrated in FIG. 6 is typical of each transfer control circuit included in each record/reproduce station.

Thus, when this illustrated circuit is included in the record/reproduce station 18, for example, the control line 46 and the audio line 48 extend, through the conducting cable 18', to each of the remote dictate stations 10, 12, ... Identical transfer control circuits exist at the other record/reproduce stations 22 and 26, for example.

The operation of the illustrated transfer control circuit will be described for the particular instance wherein the remote dictate station 10, for example, is communicating with the record/reproduce station 18. Let it be assumed that the operator at the remote dictate station wishes to dictate information having a high priority of importance which requires almost immediate transcription. Let it further be assumed that an amount of previously dictated tape exists at the record/reproduce station 18 such that an undesirably long delay is expected until the high priority information would be transcribed if recorded at the record/reproduce station. Accordingly, the operator at the remote dictate station will actuate the the priority transfer function switch so that a priority command current will be transmitted to the record/reproduce station 18 whereat this current is detected and decoded into the priority control signal. This control signal is of a positive magnitude and is supplied to the negative input of the difference amplifier 350. If the priority unit is available for communicating with the remote dictate station 10, a voltage, such as a negative voltage of relatively low magnitude, is applied to the terminal 353. Conversely, if the priority unit is not available for communication, a voltage having, for example, a positive polarity and a higher magnitude is applied to the terminal 353.

If the priority control signal is produced and the priority unit is available for communication, the difference circuit 350 supplies a negative bias voltage to the pnp transistor 362 to render this transistor conductive. Of course, if the priority control signal is not produced, or if the priority unit is not available for communication, the voltages applied to the inputs of the difference amplifier 350 are such that a positive bias potential is applied to the transistor 362 which renders the transistor nonconductive. It is appreciated that, when the transistor 362 conducts current therethrough, a relatively positive voltage, such as a binary 1, is supplied to the set input of the flip-flop circuit 366. Accordingly, this flip-flop circuit is set to supply a binary 1 to the transistor 370 which, in turn, renders this transistor conductive. Since the transistor 370 is disposed in its emitter-follower configuration, a relatively positive bias potential is applied to the base electrode of the coil driving transistor 376 so that this transistor is turned on and current flows through the transfer relay energizing coil 378 and the coil driving transistor 376 to ground.

Upon energization, the transfer relay energizing coil 378 actuates the relay contacts 378a and 378b so that the control line 46 and the audio line 48 are switched into connection between the remote dictate station 10 and the priority unit. As is appreciated, these lines pass through the record/reproduce station 18 but, because the relay contacts 378a and 378b now have been actuated, these lines are not operatively connected to the record/reproduce apparatus disposed at the record/reproduced station 18. Consequently, a dictation and/or playback operation can be effected at the priority unit under the control of the operator at the remote dictate station 10. It should be appreciated that the function decoding circuit and the operation control logic previously described with respect to FIGS. 4 and 5 can be provided at the priority unit.

Since the transfer operation is effected only when the remote dictate station is in communication with the record/reproduce station, it is recognized that to initiate and during this transfer operation, the DC voltage applied to the audio line 48 is reduced from the DC voltage normally applied to that line when the record/reproduce station 18 is not communicating with any remote dictate station. This DC voltage, after being separated from the superimposed audio signals, is compared in the difference amplifier 380 to a reference voltage. Typically, this reference voltage is greater than the DC voltage which appears on the audio line when the record/reproduce station has been seized. Accordingly, when a transfer operation is initiated, a voltage having low and/or negative polarity is supplied to the reset input of the flip-flop circuit 366. This voltage is ineffective to prevent the flip-flop circuit from being set, nor is this voltage sufficient to reset the flip-flop circuit. However, after communicating with the priority unit, if the remote dictate station is deactuated such that the audio switch included therein is opened, a voltage of higher magnitude and, for example, of positive polarity, is applied to the audio line 48. The difference amplifier 380 is responsive to this DC voltage and to the reference voltage applied to its negative input to thereby supply a positive voltage, corresponding to a binary 1 to the reset input of the flip-flop circuit 366. Consequently, the flip-flop circuit is reset and a binary 0 is supplied from the 1 output thereof to the transistor 370. The transistor 370 is rendered nonconductive to thereby turn off the transistor 376. Hence, the transfer relay energizing coil no longer is energized and the relay contacts 378a and 378b return to their normal position such that the control line 46 and the audio line 48 are again connected to the record/reproduce apparatus disposed at the record/reproduce station 18. Accordingly, the illustrated transfer control circuit is now capable of performing a subsequent transfer operation when another remote dictate station seizes the record/reproduce station and a transfer command current is transmitted.

The aforedescribed transfer operation can be manually initiated by the manual closure of the switch 358. It is recalled, from FIG. 5, that an operator at the remote dictate station can audibly communicate with a supervisory operator at the record/reproduce station. Accordingly, the dictate operator can apprise the supervisory operator of the necessity of gaining access to the priority unit so that information having a high priority of importance can be recorded thereat. If the priority unit is available to communicate with the remote dictate station and if the supervisory operator agrees that this unit should be used for recording information, the switch 358 is closed to supply a positive voltage to the negative input of the difference amplifier 350. This is equivalent to supplying the priority control signal to the negative input and, therefore, the aforedescribed transfer operation is initated.

It is appreciated that, if desired, the difference amplifier 350 may be replaced by an equivalent coincidence circuit which is adapted to perform substantially the same function as the difference amplifier, i.e., determine when the priority control signal is produced (or the control switch 358 is closed) and the priority unit is available for communication and to provide an output indicative thereof. Also, the transistors 362 and 370 may be eliminated or replaced by equivalent driving circuitry. So also, other equivalent detecting circuitry may be used to replace the difference amplifier 380.

While this invention has been particularly shown and described with reference to a certain preferred embodiment thereof, it will be obvious to those of ordinary skill in the art that various changes and modifications in form and details may be made without departing from the spirit and scope of the invention. For example, various alterations may be effected in the circuitry comprising the function control coding circuit and the function decoding circuit illustrated in FIGS. 3 and 4. Similarly, various alternative logic circuit elements may be used in place of the illustrated logic components comprising the operation control logic of FIG. 5. Where desired, NOT-AND and NOT-OR circuitry may be used to replace the AND gates, OR circuits, NAND gates and NOR circuits illustrated therein. The substitution of such logic components to perform essentially the same functions as performed by the functional logic elements depicted in FIG. 5 can be readily achieved by those skilled in the art. It is therefore intended that the appended claims be interpreted as included the foregoing and other such changes and modifications.

What is claimed is:

1. in a central dictation system having at least one record/reproduce station for recording dictated information on a record medium and for reproducing same, and having at least one remote dictate station adapted to communicate with said at least one record/reproduce station via a communication channel, apparatus for controlling the functions of said record/reproduce station comprising:

current generating means at the remote dictate station actuated when said remote dictate station is operatively connected to the record/reproduce station for selectively transmitting constant currents of predetermined magnitudes to said operatively connected record/reprocduce station, the record/reproduce of said constant currents being independent of the load presented by said communication channel and being determinative of functions to be performed;

means at the record/reproduce station for receiving said constant currents and for decoding same into control signals; and function control means responsive to said control signals for controlling the selective performance of predetermined functions of the record/reproduce station as determined by said control signals.

2. Apparatus in accordance with claim 1 wherein said current generating means comprises an actuable constant current source; and means switchably connected to said constant current source for changing the operating parameters thereof so as to correspondingly change the magnitude of the constant current generated by said constant current source.

3. Apparatus in accordance with claim 2 wherein said means for changing the operating parameters of said constant current source comprises a plurality of manually operable switches for selectively connecting predetermined impedances to said constant current source to thereby cause only a single constant current of substantially predetermined magnitude to be generated even if plural switches are actuated.

4. Apparatus in accordance with claim 3 wherein said current generating means further includes means for superposing a tone signal on a constant current when selected ones of said plurality of switches are actuated, such that the combination of a constant current of predetermined magnitude and said tone signal is determinative of a function to be performed.

5. Apparatus in accordance with claim 1 wherein said means for receiving said constant currents comprises level sensing means for sensing when the received constant current corresponds to predetermined magnitudes and for producing a control signal in accordance with said sensed magnitude.

6. Apparatus in accordance with claim 5 wherein said level sensing means comprises converting means for converting a received constant current to a voltage of corresponding magnitude; a plurality of threshold detecting means coupled in common to said converting means for receiving said converted voltage and for simultaneously comparing said voltage to a plurality of predetermined threshold levels, a threshold detecting means producing an output voltage when the threshold level associated therewith is exceeded by said converted voltage; and control signal generating means coupled to respective threshold detecting means for producing a control signal in response to the output voltage supplied thereto.

7. Apparatus in accordance with claim 6 wherein said level sensing means further comprises plural inhibit means for preventing plural control signals from being produced, each of said inhibit means being interconnected between threshold detecting means associated with adjacent threshold levels to inhibit the output voltage produced by a threshold detecting means associated with a lower threshold level from being supplied to said control signal generating means when the threshold detecting means associated with the next higher threshold level produces an output voltage.

8. Apparatus in accordance with claim 7 wherein said current generating means further includes means for selectively superposing a tone signal on said constant current; and wherein said current detecting means further includes tone signal detecting means for supplying a signal to said control signal generating means when a superposed tone signal is detected, said control signal produced by said control signal generating means being a function of said signal supplied thereto.

9. Apparatus in accordance with claim 1 wherein said function control means comprises means responsive to said control signals for selectively enabling information to be recorded on said record medium, information to be reproduced from said record medium, said record medium to be bi-directionally moved, and said recording, reproducing and moving operations to be terminated.

10. Apparatus in accordance with claim 9 wherein said function control means further comprises means responsive to a predetermined control signal for establishing a communication channel between said one remote dictate station and an additional predetermined one record/reproduce station, said predetermined record/reproduce station including current detecting means and function control means for selectively enabling audio information received from said one remote dictate station to be recorded on the record medium at said predetermined one record/reproduce station, information to be reproduced from said record medium at said predetermined record/reproduce station and to be transmitted to said one remote dictate station, said record medium at said predetermined record/reproduce station to be bi-directionally moved and said recording, reproducing and moving operations at said predetermined record/reproduce station to be terminated.

11. Apparatus in accordance with claim 9 wherein said means for enabling comprises dictate control means responsive to a first control signal for advancing said record medium past a record/playback head at a relatively slow speed and for conditioning said record/playback head to record audio information onto said record medium.

12. Apparatus in accordance with claim 11 wherein said means for selectively enabling further comprises means responsive to a second control signal for reversing said record medium at a relatively high speed for at least a minimum time duration and then advancing said record medium past said record/playback head at said relatively slow speed while conditioning said record/playback head to reproduce audio information from said record medium.

13. Apparatus in accordance with claim 12 wherein said means for selectively enabling further comprises means responsive to a third control signal for advancing said record medium at a relatively high speed.

14. Apparatus in accordance with claim 13 wherein said means for selectively enabling further comprises means responsive to a fourth control signal for terminating the advancing of said record medium.

15. Apparatus in accordance with claims 14 wherein said means for selectively enabling further comprises means for resuming the advancing of said record medium past said record/playback head at said relatively slow speed after said record medium had been stopped, to thereby resume the reproduction of audio information from said record medium.

16. A control current generator for generating control currents of predetermined magnitudes for transmission from a remote dictate station via a transmission channel to a record/reproduce station in a central dictation system to thereby control the functions of said record/reproduce station in a dictation operation, comprising:
  current generating means for generating a constant current having a predetermined magnitude determined by resistance means selectively connected thereto and being independent of the load presented by the transmission channel;
  a plurality of resistance means having different values for determing the magnitude of said constant current;
  a plurality of manually operable switches for selectively connecting individual ones of said resistance means to said current generating means;
  tone generating means for superposing a tone signal on the constant current generated by said current generating means; and
  energizing means responsive to the operation of predetermined ones of said switches for energizing said tone generating means.

17. A control current generator in accordance with claim 16 wherein said plurality of resistance means comprises a first set of differently valued resistors and a second set of resistors equal in value to said first set, said first set of resistors being connected in a current path to said energizing means such that when any one of said first set of resistors is connected to said constant current generating means, current flows therethrough to said energizing means to thereby energize said tone generating means.

18. A control signal generator for generating control signals to selectively enable functions to be performed in a central dictation system of the type wherein selected control currents of predetermined magnitudes representing individual functions are transmitted from one of a plurality of remote dictate stations to one of a plurality of record/reproduce stations, comprising:
  converting means for converting a received control current to a voltage of corresponding magnitude;
  threshold level detecting means connected to said converting means for determining the magnitude of said converted voltage and for producing individual output control signals in accordance with the determined magnitude of said converted voltage; and
  inhibit means coupled to said threshold level detecting means for inhibiting more than one control signal from being produced, regardless of the magnitude of said converted voltage.

19. A control signal generator in accordance with claim 18 wherein said threshold level detecting means comprises a plurality of threshold detectors equal in number to the number of predetermined current magnitudes for simultaneously comparing said converted voltage to the threshold level associated with each threshold detector; and a plurality of output means each coupled to a corresponding threshold detector for producing an output signal when said converted voltage exceeds the threshold level associated with said corresponding threshold detector.

20. A control signal generator in accordance with claim 19 further comprising tone detecting means for detecting a control tone selectively transmitted from a remote dictate station and accompanying a control current; and gating means coupled to said plurality of output means and to said tone detecting means for producing one of a plurality of output control signals in accordance with said produced output signal and detected control tone.

21. In a central dictation system having a plurality of remote dictate stations and a plurality of record/reproduce stations, any one of said remote dictate stations being capable of communicating with any one of said record/reproduce stations not then communicating with another dictate station, apparatus for controlling a dictation operation comprising:
  current generating means at each of said remote dictate stations and operable when said dictate station is in communication with a record/reproduce station for transmitting currents representing "dictate", "rewind", "stop", "fast forward" and "transfer" commands;
  decoding means at each of said record/reproduce stations for receiving said currents and for generating dictate, rewind, stop, fast forward and transfer control signals;
  dictate control means responsive to said dictate control signal for advancing a record medium at said record/reproduce station at a relatively slow speed past a recording head and conditioning said recording head to record audio information on said record medium;
  rewind control means responsive to said rewind control signal for reversing said record medium at a relatively fast speed for as long as the current representing said rewind command is received, and for no less than a predetermined duration; said rewind control means responsive to the termination of said rewind control signal for advancing said record medium at said relatively slow speed past a playback head and conditioning said playback head to reproduce audio information from said record medium;

stop control means responsive to said stop control signal for halting the reproduction of audio information from said record medium as controlled by said rewind control means;

playback control means responsive to subsequent generations of said stop control signal for advancing said record medium at said relatively slow speed past said playback head for the reproduction of audio information from said record medium for as long as the current representing said stop command is received, and for halting said record medium when said current representing said stop command is interrupted;

fast forward means responsive to said fast forward control signal for advancing said record medium at a relatively fast speed, said fast forward control means being further responsive to said stop control signal for halting said record medium; and transfer control means responsive to said transfer control signal for transferring said remote dictate station from communicating with said record/reproduce station to communicating with an additional, predetermined record/reproduce device if said predetermined record/reproduce device is not then communicating with another remote dictate station.

22. Apparatus in accordance with claim 21 wherein said rewind control means comprises:

pulse generating means responsive to said rewind control signal for generating an output pulse of predetermined duration;

driving means responsive to said output pulse or said rewind control signal for reversing said record medium at said relatively fast speed;

storage means for storing a representation of said output pulse or said rewind control signal and for supplying an activating signal to record advance means to advance said record medium at said relatively slow speed;

inhibit means responsive to said output pulse or said rewind control signal for inhibiting said activating signal from being supplied to said tape advance means; and means responsive to said stop control signal for erasing said stored representation from said storage means.

23. Apparatus in accordance with claim 21 wherein said playback control means comprises:

storage means for storing an indication of said rewind control signal;

means responsive to the first occurrence of said stop control signal for erasing said stored indication from said storage means after an interval of time; and gating means coupled to said storage means and responsive to a stop control signal once said stored indication has been erased from said storage means for supplying an activating signal to record advance means to advance said record medium at said relatively slow speed.

24. In a central dictation system having a plurality of remote dictate stations, a plurality of record/reproduce stations and conducting means for providing communication channels between said dictate stations and said record/reproduce stations and wherein any one of said dictate stations is adapted to individually selectively communicate with any one of said record/reproduce stations, apparatus for connecting a communicating dictate station to a predetermined, additional record/reproduce station, comprising:

current generating means at said communicating dictate station for transmitting a constant current of predetermined magnitude independent of the load presented by said communication channel to the one record/reproduce station in communication therewith;

control signal generating means at said communicating record/reproduce station responsive to said constant current of predetermined magnitude for generating a transfer control signal;

switch means energized in response to said transfer control signal for establishing a transmission channel between said communicating dictate station and said predetermined additional record/reproduce station if said predetermined additional record/reproduce station is not then communicating with any other dictate station; and means responsive to the termination of communication between said communicating dictate station and said predetermined additional record/reproduce station for de-energizing said switch means to thereby interrupt said transmission channel.

25. Apparatus in accordance with claim 24 further comprising manually operable means for energizing said switch means.

26. Apparatus in accordance with claim 25 wherein said switch means comprises storage means for storing said transfer control signal if said predetermined additional record/reproduce station is not then communicating with any other dictate station; and electromagnetic switching means energized in response to said stored transfer control signal for switching said conducting means from said communicating record/reproduce station to said predetermined additional record/reproduce station such that said communicating dictate station is connected to said predetermined additional record/reproduce station.

27. Apparatus in accordance with claim 26 wherein said means for de-energizing said switch means comprises detecting means for detecting a predetermined condition on said conducting means representing the termination of communication; and means responsive to said detecting means for erasing said transfer control signal from said storage means to thereby de-energize said electromagnetic switching means such that said conducting means is switched from said predetermined additional record/reproduce station to said communicating record/reproduce station.

* * * * *